United States Patent
Shellhammer et al.

(10) Patent No.: US 11,924,812 B2
(45) Date of Patent: Mar. 5, 2024

(54) ENHANCED TRIGGER FRAME

(71) Applicant: QUALCOMM Incorporated, San Diego, CA (US)

(72) Inventors: Stephen Jay Shellhammer, Ramona, CA (US); Sameer Vermani, San Diego, CA (US); Jialing Li Chen, San Diego, CA (US); Bin Tian, San Diego, CA (US); Alfred Asterjadhi, San Diego, CA (US); Yanjun Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 17/382,585

(22) Filed: Jul. 22, 2021

(65) Prior Publication Data
US 2022/0030572 A1 Jan. 27, 2022

Related U.S. Application Data

(60) Provisional application No. 63/055,599, filed on Jul. 23, 2020.

(51) Int. Cl.
*H04W 72/044* (2023.01)
*H04L 69/22* (2022.01)
(Continued)

(52) U.S. Cl.
CPC .......... *H04W 72/044* (2013.01); *H04L 69/22* (2013.01); *H04W 72/51* (2023.01); *H04W 84/12* (2013.01)

(58) Field of Classification Search
CPC ................................................. H04W 72/044
See application file for complete search history.

(56) References Cited

U.S. PATENT DOCUMENTS

2016/0302229 A1* 10/2016 Hedayat ................ H04L 69/324
2021/0227529 A1    7/2021 Chu et al.
(Continued)

FOREIGN PATENT DOCUMENTS

WO    WO-2020027847 A1    2/2020

OTHER PUBLICATIONS

International Search Report and Written Opinion—PCT/US2021/042905—ISA/EPO—dated Oct. 29, 2021.
(Continued)

*Primary Examiner* — Jason E Mattis
(74) *Attorney, Agent, or Firm* — Kevin M. Donnelly; Holland & Hart LLP

(57) ABSTRACT

This disclosure provides methods, devices and systems for generating enhanced trigger frames. Some implementations more specifically relate to trigger frame designs that support gains in data throughput achievable in accordance with the IEEE 802.11be amendment, and future generations, of the IEEE 802.11 standard. In some implementations, an enhanced trigger frame may be used to solicit a non-legacy trigger-based (TB) physical layer protocol convergence protocol (PLCP) protocol data unit (PPDU) from one or more wireless stations (STAs). In some implementations, the enhanced trigger frame may be configurable to support multiple versions of the IEEE 802.11 standard. For example, an enhanced trigger frame may be configured in accordance with a legacy trigger frame format or a non-legacy trigger frame format. Thus, when configured in accordance with the legacy trigger frame format, the enhanced trigger frame can also be used to a legacy TB PPDU from one or more STAs.

26 Claims, 20 Drawing Sheets

(51) Int. Cl.
H04W 72/51 (2023.01)
H04W 84/12 (2009.01)

(56) References Cited

U.S. PATENT DOCUMENTS

| | | | | |
|---|---|---|---|---|
| 2021/0392644 A1* | 12/2021 | Liu | ........................ | H04L 5/0094 |
| 2021/0400727 A1* | 12/2021 | Lu | ........................ | H04L 1/0068 |
| 2022/0201769 A1* | 6/2022 | Li | ........................ | H04W 72/0453 |
| 2023/0109874 A1* | 4/2023 | Gan | ........................ | H04L 5/0064 |
| | | | | 370/329 |
| 2023/0130569 A1* | 4/2023 | Kim | ........................ | H04L 65/40 |
| | | | | 370/329 |

OTHER PUBLICATIONS

LAN/MAN Standards Committee of the IEEE Computer Society: "Draft Standard for Information Technology—Tele-Communications and Information Exchange Between Systems Local and Metropolitan Area Networks—Specific Requirements, Part 11: Wireless LAN Medium Access Control (MAC) and Physical Layer (PHY) Specification, Amendment 1: Enhancements for High Efficiency", IEEE Draft, Draft P802.11AX_D6.1, IEEE-SA, Piscataway, NJ USA, vol. 802 . 11ax drafts, No. D6.1, May 11, 2020 (May 11, 2020), pp. 1-784, XP068168293, Retrieved from the Internet : URL: http://www.ieee802.org/11/private/Draft_Standards/11ax/Draft%20P802.11ax_D6.1.pdf [Retrieved on May 11, 2020], pp. 116, 117, p. 121, p. 145, Tables 9-93a, pp. 148-153, pp. 192-193, tables 9-321b, p. 196, pp. 477, 478, p. 486, pp. 597-598, tables 27-31, pp. 601-609, p. 118-p. 123.

Shellhammer S., (Qualcomm): "Enhanced Trigger Frame for EHT Support", IEEE Draft, 11-20-1429-06-00BE-Enhanced-Trigger-Frame-for-EHT-Support, IEEE-SA Mentor, Piscataway, NJ, USA vol. 802.11 EHT, 802.11be, No. 6, Jan. 14, 2021 (Jan. 14, 2021), pp. 1-35, XP068176018, Retrieved from the Internet: URL: https://mentor.ieee.org/802.11/dcn/20/11-20-1429-06-00be-enhanced-trigger-frame-for-eht-support.pptx. [Retrieved on Jan. 14, 2021], p. 2-p. 27.

* cited by examiner

*Figure 8*

ENHANCED TRIGGER FRAME

CROSS-REFERENCE TO RELATED APPLICATIONS

This Patent application claims priority to U.S. Provisional Patent Application No. 63/055,599 entitled "ENHANCED TRIGGER FRAME" and filed on Jul. 23, 2020, which is assigned to the assignee hereof. The disclosures of all prior Applications are considered part of and are incorporated by reference in this Patent Application.

TECHNICAL FIELD

This disclosure relates generally to wireless communication, and more specifically to enhanced trigger frames for wireless communications.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Existing versions of the IEEE 802.11 standards support trigger-based uplink communications. In particular, the IEEE 802.11ax amendment of the IEEE 802.11 standard defines a trigger frame format which can be used to solicit the transmission of trigger-based (TB) physical layer convergence protocol (PLCP) data units (PPDUs) from one or more STAs. The trigger frame allocates resources for the transmission of the TB PPDUs and indicates how the TB PPDUs are to be configured for transmission. New WLAN communication protocols are being developed to enable enhanced WLAN communication features such as, for example, increases in bandwidth and number of spatial streams. As new WLAN communication protocols enable enhanced features, new trigger frame formats are needed to support the new features in TB PPDUs.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include receiving a trigger frame soliciting a physical layer convergence protocol (PLCP) protocol data unit (PPDU), where the trigger frame includes a medium access control (MAC) header, a common information field that immediately follows the MAC header, and a special user information field associated with the common information field, where the common information field and the special user information field collectively include a plurality of subfields carrying configuration information indicating a configuration for the solicited PPDU, and where the common information field includes one or more bits signaling a presence of the special user information field in the trigger frame; and transmitting the PPDU, responsive to the trigger frame, based on the configuration information.

In some aspects, the plurality of subfields may include an uplink bandwidth subfield carrying first bandwidth information associated with the PPDU and may further include an uplink bandwidth extension subfield carrying second bandwidth information associated with the PPDU, where the first and second bandwidth information jointly indicate a bandwidth associated with the PPDU. In some implementations, the bandwidth associated with the PPDU may be greater than 160 MHz. In some other aspects, the plurality of subfields may include a plurality of spatial reuse subfields in the special user information field, where the plurality of spatial reuse subfields indicates a plurality of spatial reuse thresholds associated with the PPDU. Still further, in some aspects, the plurality of subfields may include a bandwidth puncturing subfield in the special user information field, where the bandwidth puncturing subfield indicates whether one or more subbands spanning a bandwidth associated with the PPDU are punctured.

In some aspects, the special user information field may be the first user information field in a user information list immediately following the common information field. In some implementations, the special user information field may include an association identifier (AID) value not assigned to any wireless stations (STAs) associated with the same basic service set (BSS) as the wireless communication device. In some implementations, the user information list may further include one or more user information fields carrying additional configuration for configuring the PPDU, where a format of each of the one or more user information fields is indicated by the one or more bits in the common information field and one or more bits in the respective user information field, where the format of each user information field is one of a legacy user information field format or a non-legacy user information field format.

In some implementations, a format of the PPDU may be indicated by the one or more bits in the common information field and the one or more bits in each of the one or more user information fields, where the format of the PPDU is one of a legacy PPDU format or a non-legacy PPDU format. In some implementations, each user information field formatted in accordance with the non-legacy user information field format may include a spatial stream allocation subfield indicating a number of spatial streams allocated for a user associated with the user information field and may further include a starting spatial stream index associated with the number of spatial streams, where the starting spatial stream index is one of sixteen spatial stream indices. In some implementations, the starting spatial stream index may be indicated by a 4-bit subfield of the spatial stream allocation subfield and the number of spatial streams may be indicated by a 2-bit subfield of the spatial stream allocation subfield.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving a trigger frame soliciting a PPDU, where the trigger frame includes a MAC header, a common information field that immediately follows the MAC header, and a special user information field associated with the common information field, where the common information field and the special user information field collectively include a plurality of subfields carrying configuration information indicating a configuration for the solicited PPDU, and where the common information field includes one or more bits signaling a presence of the special user information field in the trigger frame; and transmitting the PPDU, responsive to the trigger frame, based on the configuration information.

Another innovative aspect of the subject matter described in this disclosure can be implemented as a method of wireless communication. The method may be performed by a wireless communication device, and may include transmitting a trigger frame soliciting a PPDU, where the trigger frame includes a MAC header, a common information field that immediately follows the MAC header, and a special user information field associated with the common information field, where the common information field and the special user information field collectively include a plurality of subfields carrying configuration information indicating a configuration for the solicited PPDU, and where the common information field includes one or more bits signaling a presence of the special user information field in the trigger frame; and receiving the PPDU responsive to the trigger frame.

In some aspects, the plurality of subfields may include an uplink bandwidth subfield carrying first bandwidth information associated with the PPDU and may further include an uplink bandwidth extension subfield carrying second bandwidth information associated with the PPDU, where the first and second bandwidth information jointly indicate a bandwidth associated with the PPDU. In some implementations, the bandwidth associated with the PPDU may be greater than 160 MHz. In some other aspects, the plurality of subfields may include a plurality of spatial reuse subfields in the special user information field, where the plurality of spatial reuse subfields indicates a plurality of spatial reuse thresholds associated with the PPDU. Still further, in some aspects, the plurality of subfields may include a bandwidth puncturing subfield in the special user information field, where the bandwidth puncturing subfield indicates whether one or more subbands spanning a bandwidth associated with the PPDU are punctured.

In some aspects, the special user information field may be the first user information field in a user information list immediately following the common information field. In some implementations, the special user information field may include an AID value not assigned to any STAs associated with the same BSS as the wireless communication device. In some implementations, the user information list may further include one or more user information fields carrying additional configuration for configuring the PPDU, where a format of each of the one or more user information fields is indicated by the one or more bits in the common information field and one or more bits in the respective user information field, where the format of each user information field is one of a legacy user information field format or a non-legacy user information field format.

In some implementations, a format of the PPDU may be indicated by the one or more bits in the common information field and the one or more bits in each of the one or more user information fields, where the format of the PPDU is one of a legacy PPDU format or a non-legacy PPDU format. In some implementations, each user information field formatted in accordance with the non-legacy user information field format may include a spatial stream allocation subfield indicating a number of spatial streams allocated for a user associated with the user information field and may further include a starting spatial stream index associated with the number of spatial streams, where the starting spatial stream index is one of sixteen spatial stream indices. In some implementations, the starting spatial stream index may be indicated by a 4-bit subfield of the spatial stream allocation subfield and the number of spatial streams may be indicated by a 2-bit subfield of the spatial stream allocation subfield.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including transmitting a trigger frame soliciting a PPDU, where the trigger frame includes a MAC header, a common information field that immediately follows the MAC header, and a special user information field associated with the common information field, where the common information field and the special user information field collectively include a plurality of subfields carrying configuration information indicating a configuration for the solicited PPDU, and where the common information field includes one or more bits signaling a presence of the special user information field in the trigger frame; and receiving the PPDU responsive to the trigger frame.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 8 shows an example frame structure of a non-legacy PPDU allocated over multiple subchannels of a wireless channel according to some implementations.

Like reference numbers and designations in the various drawings indicate like elements.

DETAILED DESCRIPTION

Figure 1:
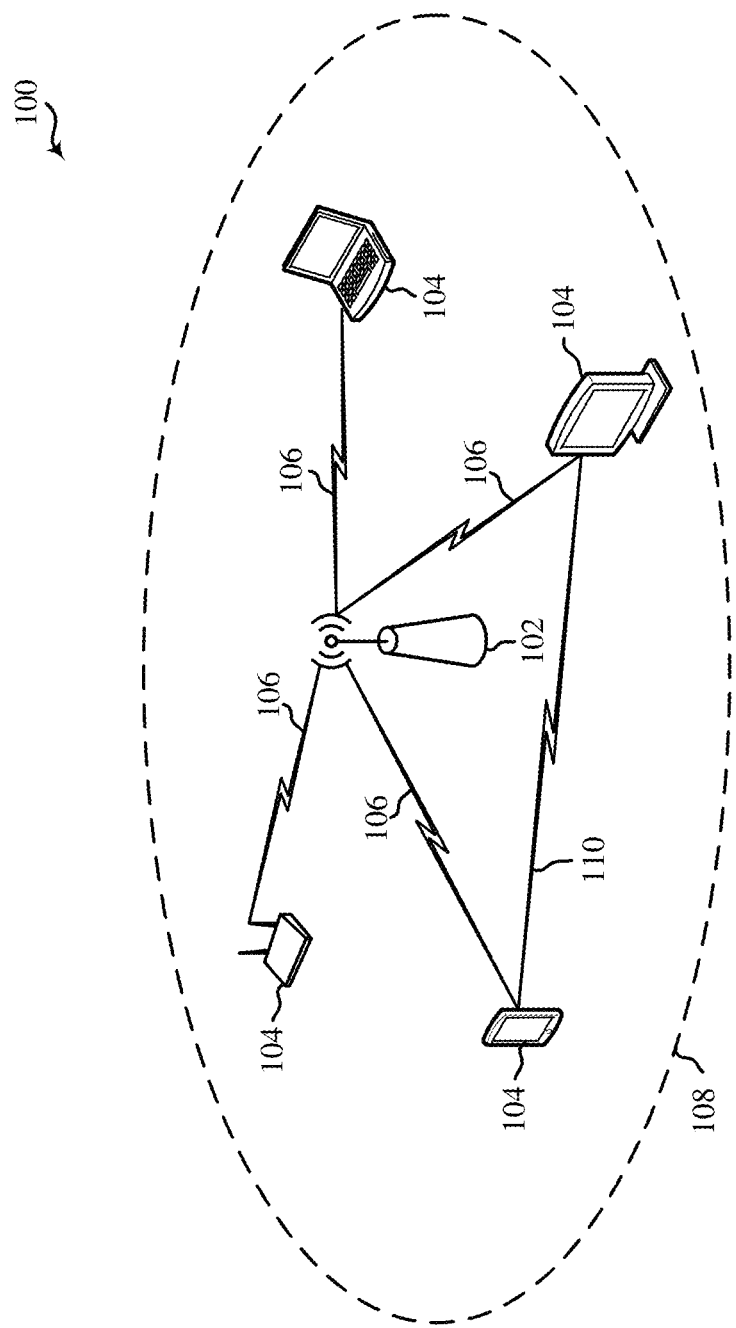
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (JOT) network.

Various aspects relate generally to trigger-based communications that support new wireless communication protocols, and more particularly, to trigger frame designs that support enhanced wireless communication features associated with the IEEE 802.11be amendment, and future generations, of the IEEE 802.11 standard. In some aspects, an enhanced trigger frame may be used to solicit a non-legacy trigger-based (TB) physical layer protocol convergence protocol (PLCP) protocol data unit (PPDU) from one or more STAs. As used herein, the term "non-legacy" may refer to PPDU formats and communication protocols conforming to the IEEE 802.11be amendment, and future generations, of the IEEE 802.11 standard. In contrast, the term "legacy" may be used herein to refer to PPDU formats and communication protocols conforming to the IEEE 802.11ax amendment of the IEEE 802.11 standard, or earlier generations of the IEEE 802.11 standard, but not conforming to all mandatory features of the IEEE 802.11be amendment, or future generations, of the IEEE 802.11 standard. In some implementations, the enhanced trigger frame may be configurable to support multiple versions of the IEEE 802.11 standard. For example, an enhanced trigger frame may be configured in accordance with a legacy trigger frame format or a non-legacy trigger frame format. Thus, when configured in accordance with the legacy trigger frame format, the enhanced trigger frame can also be used to solicit a legacy TB PPDU from one or more STAs.

Particular implementations of the subject matter described in this disclosure can be implemented to realize one or more of the following potential advantages. By soliciting the transmission of non-legacy TB PPDUs, the enhanced trigger frame may support gains in data throughput achievable in accordance with the IEEE 802.11be amendment of the IEEE 802.11 standard. Among other examples, the enhanced trigger frame of the present implementations may enable non-legacy TB PPDUs to be transmitted over bandwidths of up to 320 MHz, on up to 16 spatial streams. By designing the enhanced trigger frame to support multiple versions of the IEEE 802.11 standard, aspects of the present disclosure may ensure that the enhanced trigger frame format is backwards compatible with existing STAs. As a result, a single trigger frame may be used to concurrently solicit uplink transmissions from STAs operating in accordance with the IEEE 802.11ax amendment of the IEEE 802.11 standard (also referred to herein as "legacy STAs") and STAs operating in accordance with the IEEE 802.11be amendment of the IEEE 802.11 standard (also referred to herein as "non-legacy STAs). More specifically, aspects of the present disclosure provide a single trigger frame design that can be used to solicit legacy and non-legacy PPDUs.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

Some APs and STAs may be configured to implement spatial reuse techniques. For example, APs and STAs configured for communications using IEEE 802.11ax or 802.11be may be configured with a BSS color. APs associated with different BSSs may be associated with different BSS colors. If an AP or a STA detects a wireless packet from another wireless communication device while contending for access, the AP or STA may apply different contention parameters based on whether the wireless packet is transmitted by, or transmitted to, another wireless communication device within its BSS or from a wireless communication device from an overlapping BSS (OBSS), as determined by a BSS color indication in a preamble of the wireless packet. For example, if the BSS color associated with the wireless packet is the same as the BSS color of the AP or STA, the AP or STA may use a first received signal strength indication (RSSI) detection threshold when performing a CCA on the wireless channel. However, if the BSS color associated with the wireless packet is different than the BSS color of the AP or STA, the AP or STA may use a second RSSI detection threshold in lieu of using the first RSSI detection threshold when performing the CCA on the wireless channel, the second RSSI detection threshold being greater than the first RSSI detection threshold. In this way, the requirements for winning contention are relaxed when interfering transmissions are associated with an OBSS.

Figure 2A:
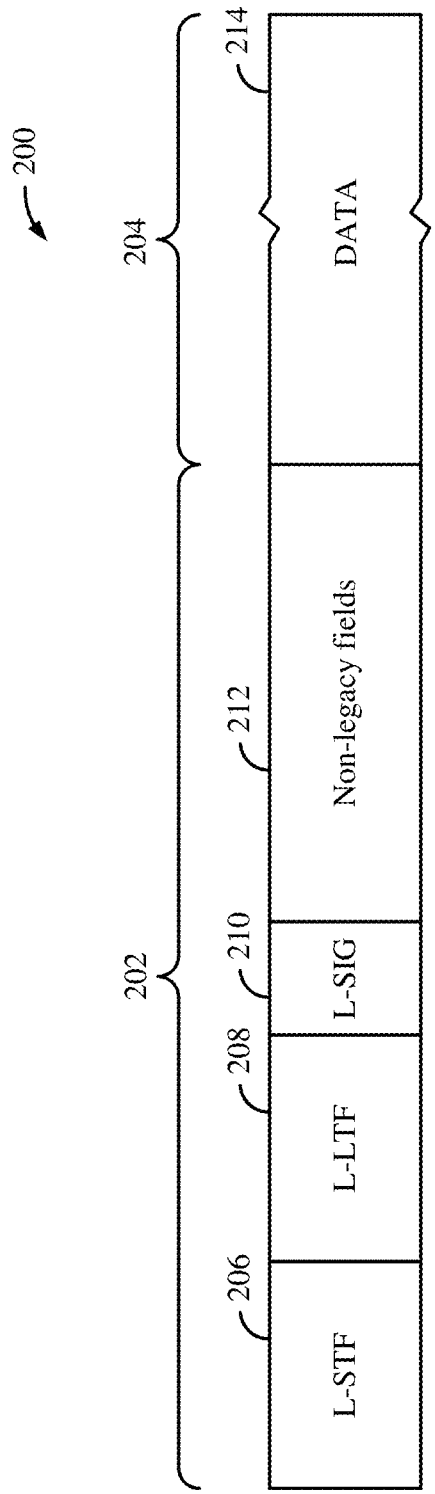
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
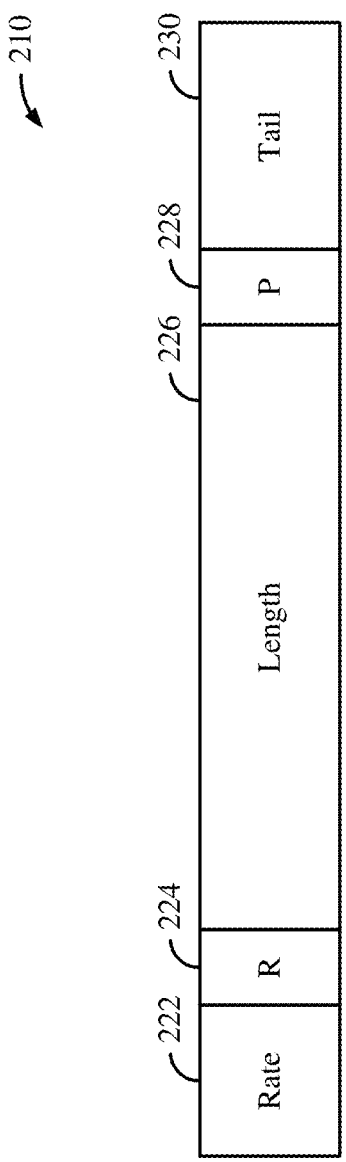
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3:
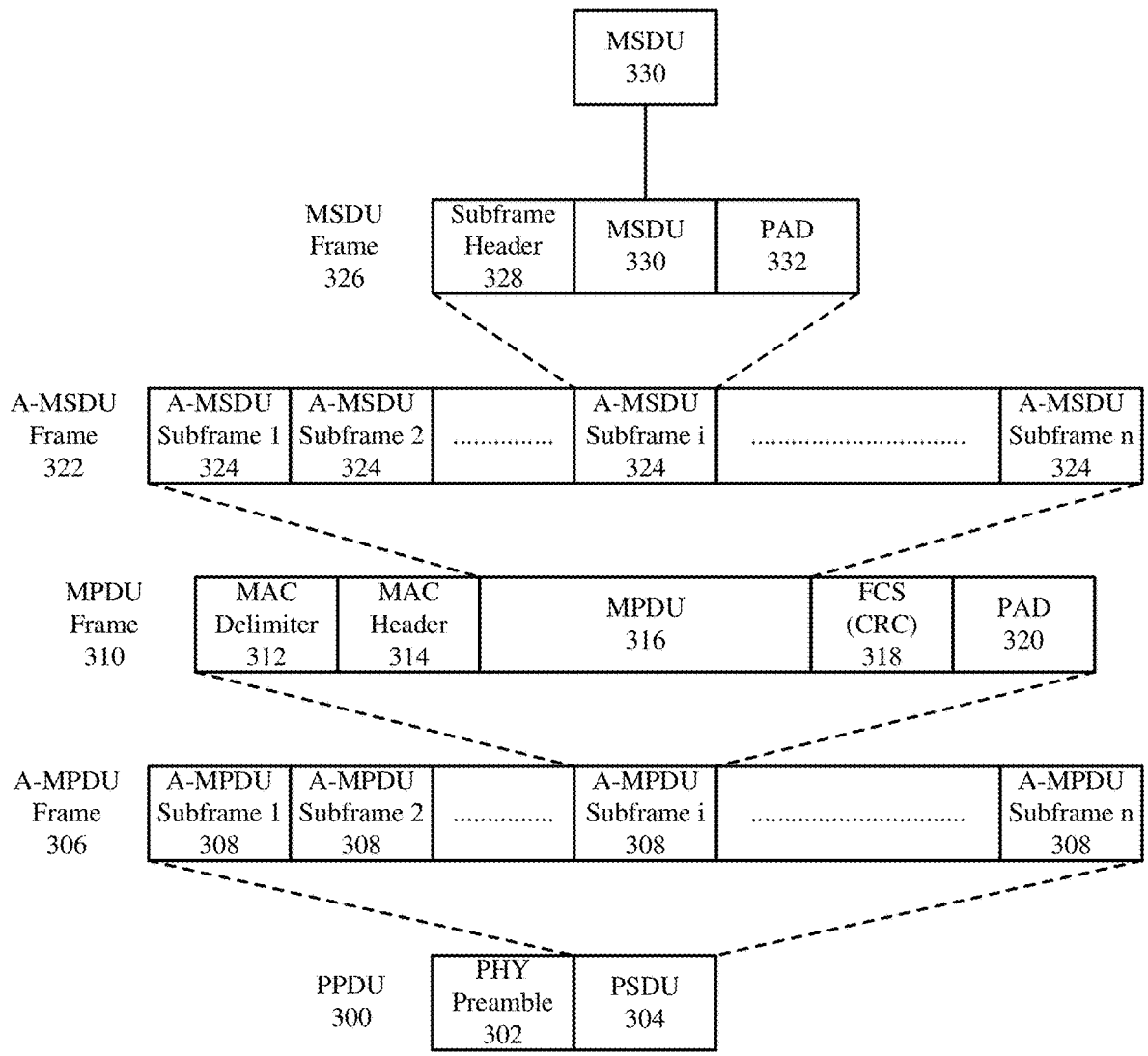
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 316. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
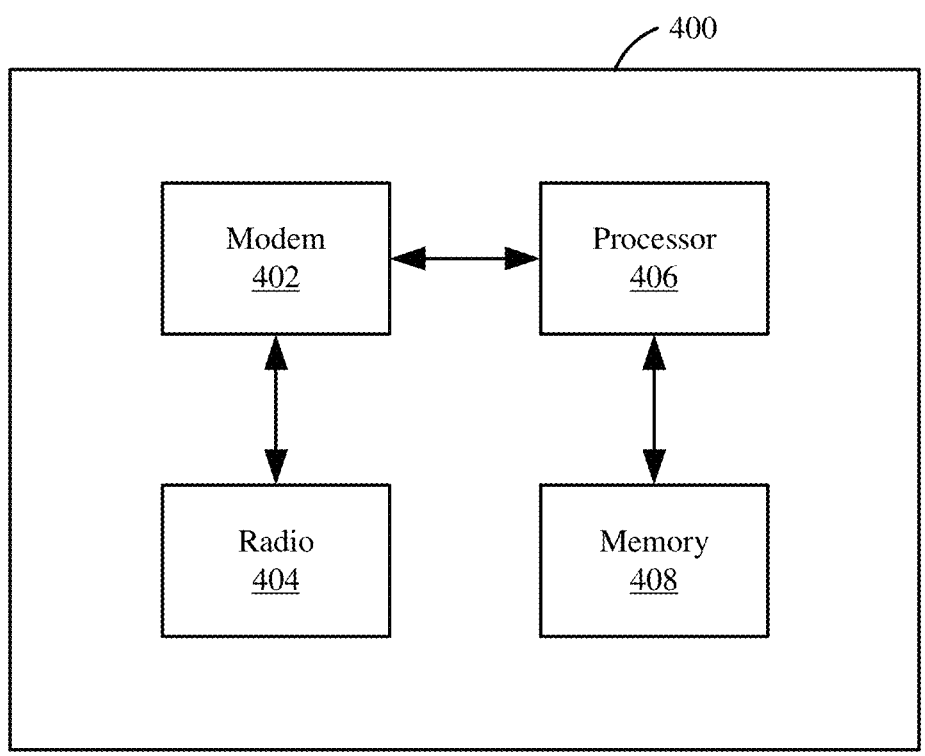
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number Nss of spatial streams or a number NsTs of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for UQ imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 404 can include tangible storage media such as random-access memory (RAM) or read-only memory (ROM), or combinations thereof. The memory 404 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
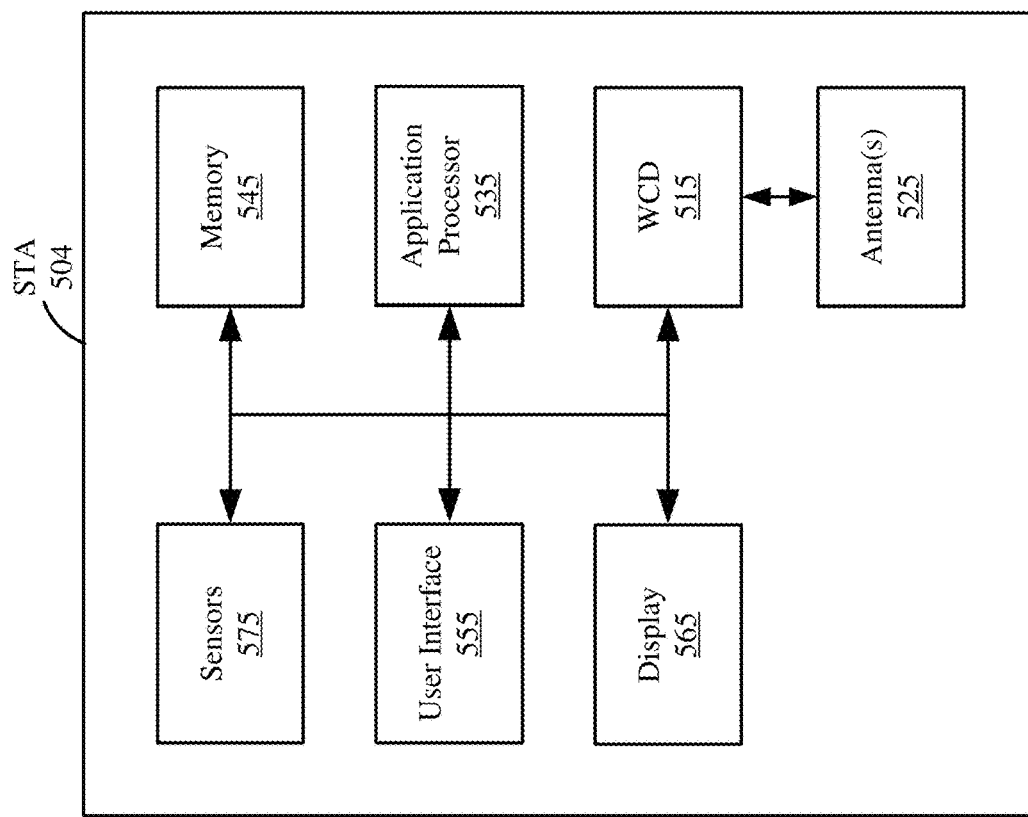
FIG. 5B shows a block diagram of an example STA.
Figure 5A:
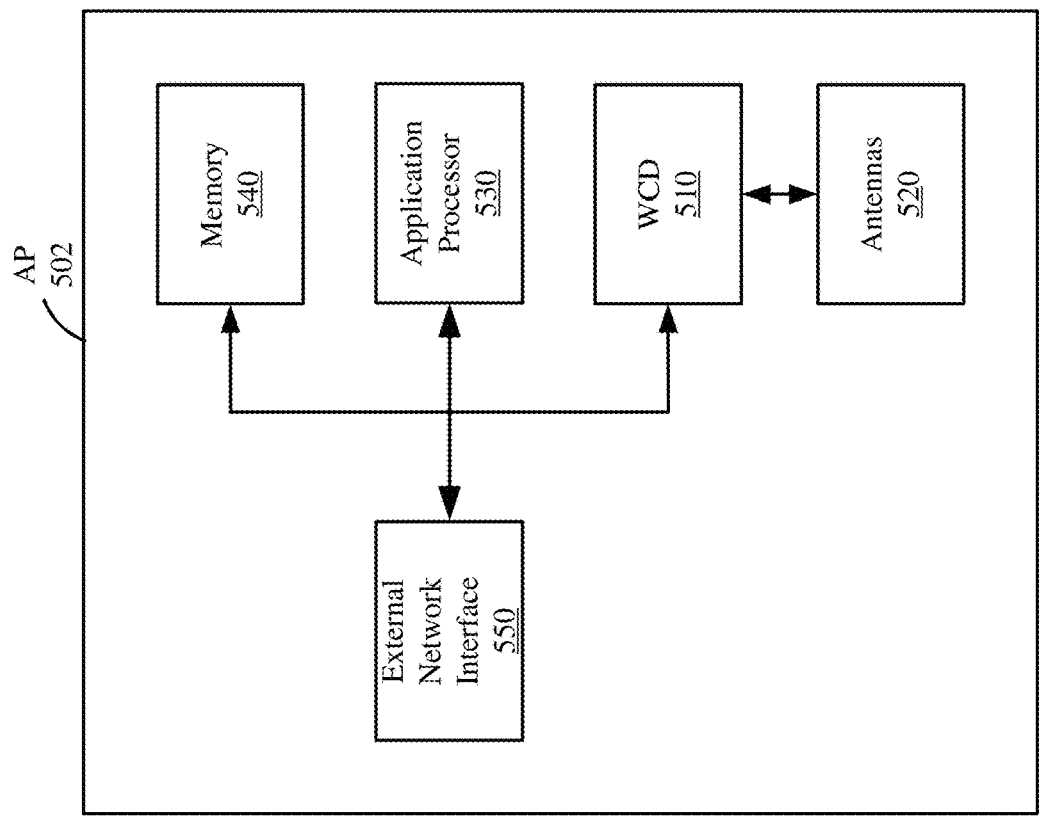
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, new WLAN communication protocols are being developed to enable enhanced WLAN communication features. Such enhanced features include, among other examples, increases in bandwidth (up to 320 MHz) and number of spatial streams (up to 16 spatial streams), as well as support for multiple-resource unit (M-RU) allocations. As new wireless communication protocols enable enhanced features, new preamble designs are needed support signaling regarding features and resource allocations. Signaling refers to control fields or information that can be used by a wireless communication device to interpret another field or portion of a packet. For some wireless communication techniques, such as OFDMA, a wireless channel may utilize multiple subchannels that can be divided or grouped in a transmission to form different resource units (RUs). The signaling can indicate which RUs include data for a particular recipient. Other types of signaling include indicators regarding which subchannels carry further signaling or which subchannels are punctured. Still further, some signaling can indicate the lengths or availability of one or more fields or subfields in the data packet.

Figure 6:
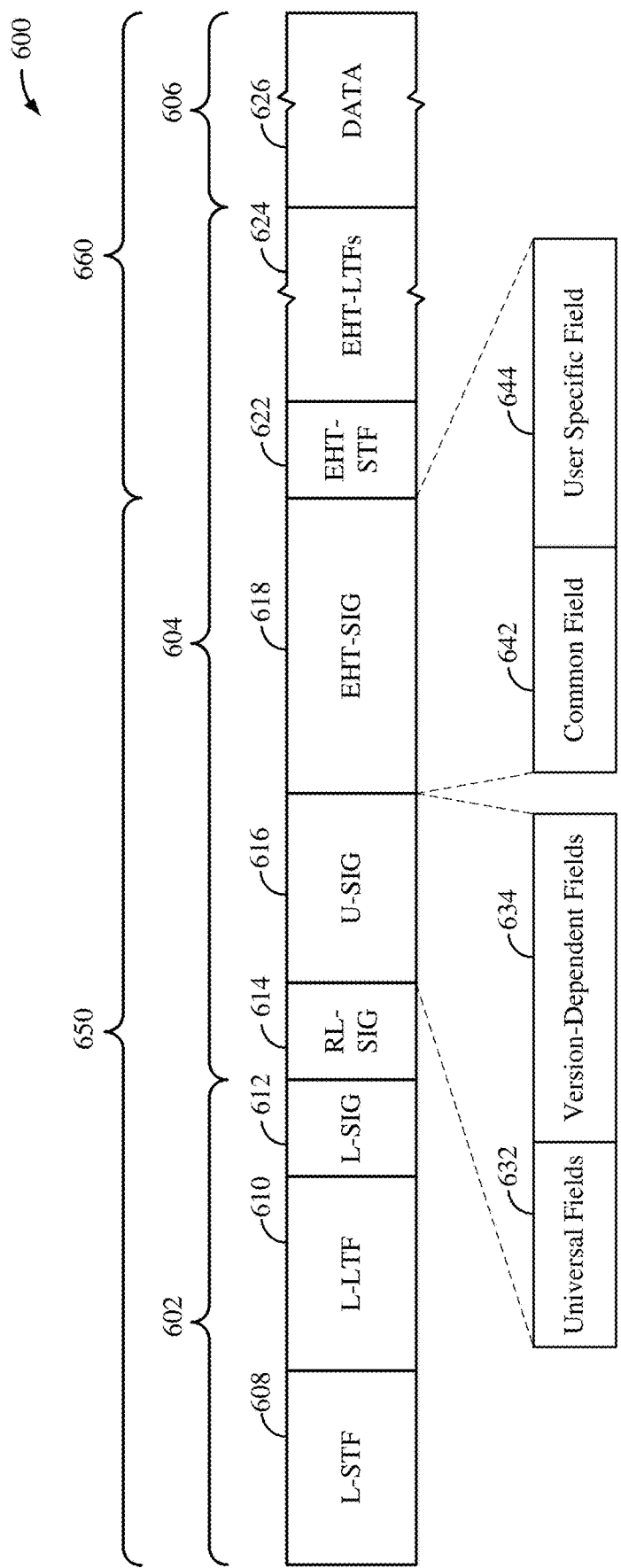
FIG. 6 shows an example PPDU usable for communications between an AP and a number of STAs according to some implementations.

FIG. 6 shows an example PPDU 600 usable for wireless communication between an AP and a number of STAs according to some implementations. The PPDU 600 may be used for SU, MU-OFDMA or MU-MIMO transmissions. The PPDU 600 includes a PHY preamble including a first portion 602 and a second portion 604. The PPDU 600 may further include a PHY payload 606 after the preamble, for example, in the form of a PSDU including DATA field 626.

The first portion 602 includes L-STF 608, L-LTF 610, and L-SIG 612. The second portion 604 of the preamble and DATA field 626 may be formatted as a non-legacy, or Extreme High Throughput (EHT), WLAN preamble and frame, respectively, in accordance with the IEEE 802.11be amendment to the IEEE 802.11 wireless communication protocol standard, or may be formatted as a preamble and frame, respectively, conforming to any later (post-HE) version of a new wireless communication protocol conforming to a future IEEE 802.11 wireless communication protocol amendment or other standard. In some implementations, the PPDU 600 also may be additionally logically partitioned into a pre-EHT portion 650 (including PPDU fields 608-618) and an EHT portion 660 (including PPDU fields 622-626).

The second portion 604 of the preamble includes a repeated legacy signal field (RL-SIG) 614 and multiple wireless communication protocol version-dependent signal fields after RL-SIG 614. For example, the second portion 604 may include a universal signal field (U-SIG) 616, an EHT signal field (EHT-SIG) 618, an EHT short training field (EHT-STF) 622, and a number of EHT long training fields (EHT-LTFs) 624.

In some implementations, U-SIG 616 may include one or more universal fields 632 and one or more version-dependent fields 634. Information in the universal fields 632 may include, for example, a version identifier (starting from the IEEE 802.11be amendment and beyond) and channel occupancy and coexistence information (such as a punctured channel indication). The version-dependent fields 634 may include format information fields used for interpreting other fields of U-SIG 616 and EHT-SIG 618. In some implementations, the version-dependent fields 634 may include a PPDU format field. The PPDU format field may indicate a general PPDU format for the PPDU 600 (such as a trigger-based (TB), SU, or MU PPDU format).

In some implementations, EHT-SIG 618 may include a common field 642 and a user specific field 644. The common field 642 may include one or more bits or fields overflowed from U-SIG 616 or RU allocation information for intended recipients of the PPDU 600. The user specific field 644 may include one or more user fields carrying per-user information for one or more intended recipients of the PPDU 600. In some implementations, RU allocation information and the user specific field 644 may be absent from the SU PPDU format. Still further, in some implementations, EHT-SIG 618 may be absent from the TB PPDU format.

As described previously, in IEEE 802.11be, and future generations, new fields may be used to carry signaling information. For example, at least some of the new fields and signaling information may be included in U-SIG 616. Additionally, new fields and signaling information may be included in EHT-SIG 618 (or may overflow from U-SIG 616 into EHT-SIG 618). In some implementations, U-SIG 616 may include signaling regarding types or formats of additional signal fields (such as EHT-SIG 618) that follow U-SIG 616. EHT-SIG 618 may be used by an AP to identify and inform one or more STAs 104 that the AP has scheduled UL or DL resources. EHT-SIG 618 may be decoded by each compatible STA 104 served by the AP 102. EHT-SIG 618 may generally be used by a receiving device to interpret bits in the DATA field 626. In the context of DL MU-OFDMA, such information enables the respective STAs 104 to identify and decode corresponding RUs in the associated DATA field 626.

Figure 7A:
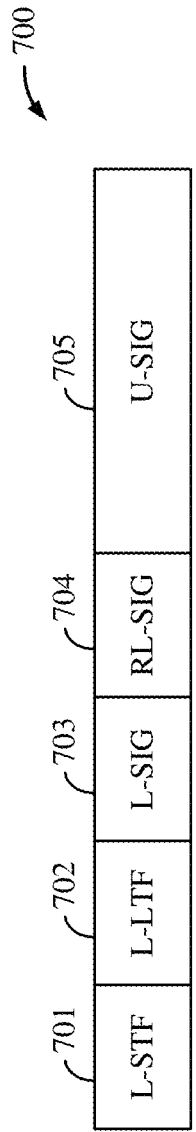
FIG. 7A shows an example frame structure for a trigger-based (TB) PPDU according to some implementations.

FIG. 7A shows an example frame structure for a TB PPDU 700 according to some implementations. In some implementations, the TB PPDU 700 may be one example of the PPDU 600 of FIG. 6. For simplicity, only the pre-EHT portion of the TB PPDU 700 (corresponding to the portion 650 of PPDU 600) is shown in FIG. 7A. The TB PPDU 700 includes an L-STF 701, an L-LTF 702, an L-SIG 703, an RL-SIG 704, and a U-SIG 705 which may correspond to L-STF 608, L-LTF 610, L-SIG 612, RL-SIG 614, and U-SIG 616, respectively, of PPDU 600. In the example TB PPDU format, the TB PPDU 700 may not include an EHT-SIG. With reference for example to FIG. 6, the TB PPDU 700 may not include any U-SIG overflow, RU allocation information, or other user-specific information (such as provided in the user specific field 644).

Figure 7B:
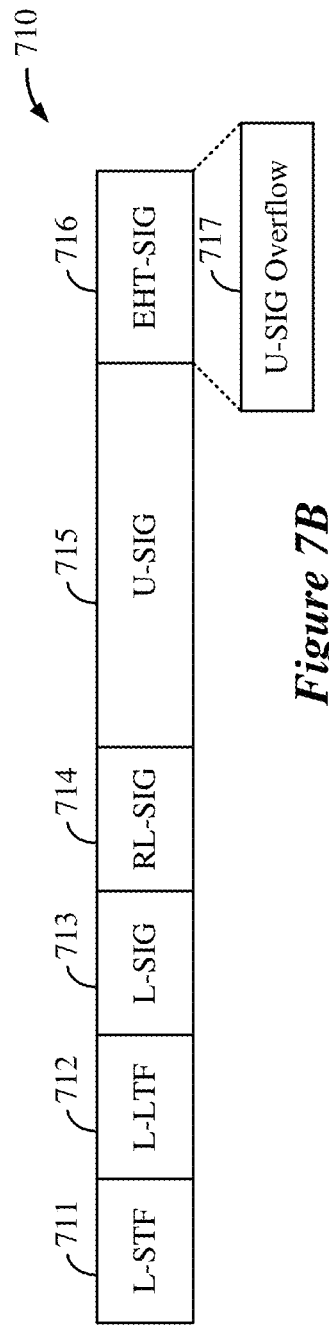
FIG. 7B shows an example frame structure for a single-user (SU) PPDU according to some implementations.

FIG. 7B shows an example frame structure for an SU PPDU 710 according to some implementations. In some implementations, the SU PPDU 710 may be one example of the PPDU 600 of FIG. 6. For simplicity, only the pre-EHT portion of the SU PPDU 710 (corresponding to the portion 650 of PPDU 600) is shown in FIG. 7B. The SU PPDU 710 includes an L-STF 711, an L-LTF 712, an L-SIG 713, an RL-SIG 714, a U-SIG 715, and an EHT-SIG 716 which may correspond to L-STF 608, L-LTF 610, L-SIG 612, RL-SIG 614, U-SIG 616, and EHT-SIG 616, respectively, of PPDU 600. In the example SU PPDU format, EHT-SIG 716 may include only bits or fields 717 overflowed from U-SIG 715. With reference for example to FIG. 6, the SU PPDU 710 may not include any RU allocation information, or other user-specific information (such as provided in the user specific field 644).

Figure 7C:
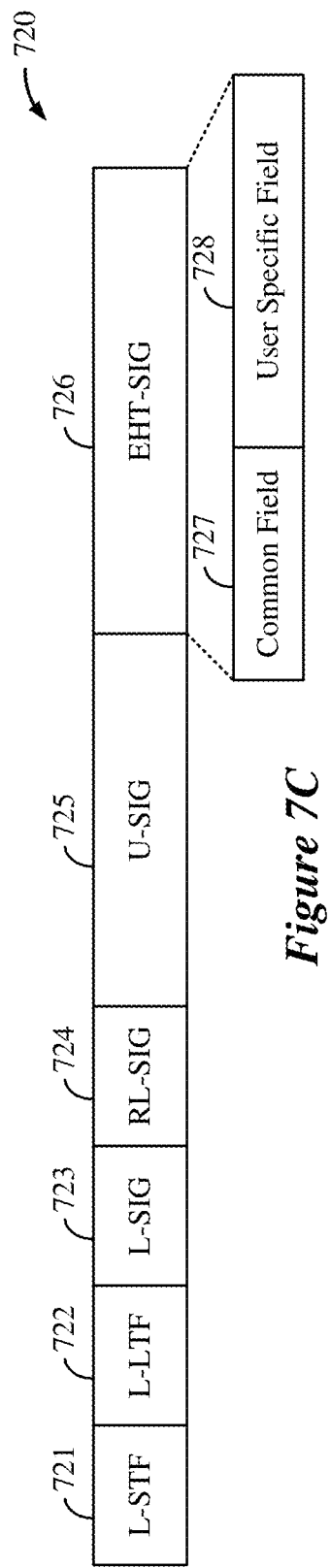
FIG. 7C shows an example frame structure for a multi-user (MU) PPDU according to some implementations.

FIG. 7C shows an example frame structure for a MU PPDU 720 according to some implementations. In some implementations, the MU PPDU 720 may be one example of the PPDU 600 of FIG. 6. For simplicity, only the pre-EHT portion of the MU PPDU 720 (corresponding to the portion 650 of PPDU 600) is shown in FIG. 7C. The MU PPDU 720 includes an L-STF 721, an L-LTF 722, an L-SIG 723, an RL-SIG 724, a U-SIG 725, and an EHT-SIG 726 which may correspond to L-STF 608, L-LTF 610, L-SIG 612, RL-SIG 614, U-SIG 616, and EHT-SIG 616, respectively, of PPDU 600. In the example MU PPDU format, EHT-SIG 726 may include a common field 727 and a user specific field 728. With reference for example to FIG. 6, the common field 642 may further include U-SIG overflow or RU allocation information. The user specific field 728 may include per-user information for one or more intended recipients of the MU PPDU 720.

Figure 8:
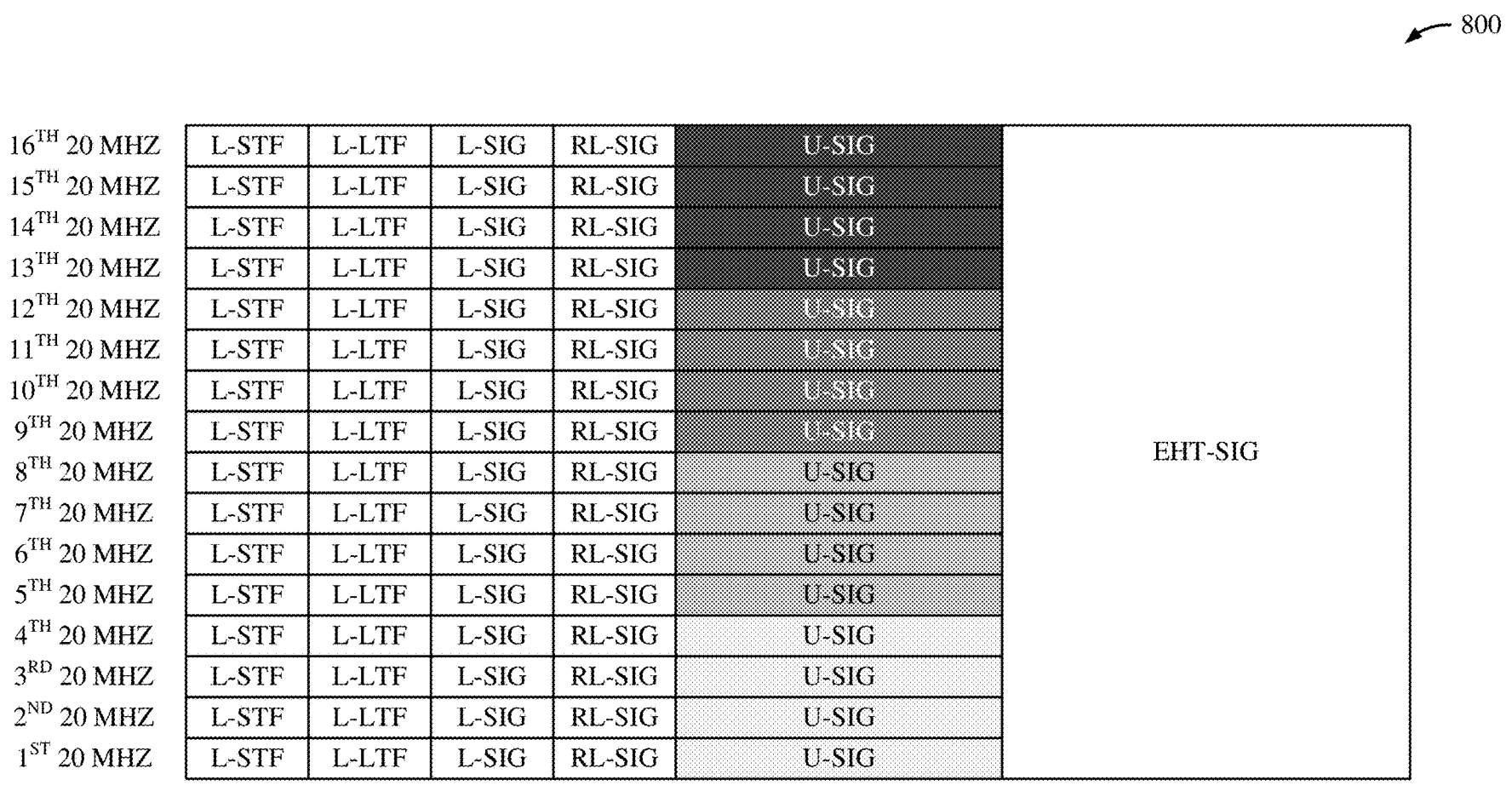

FIG. 8 shows an example frame structure of a non-legacy PPDU 800 allocated over multiple subchannels of a wireless channel according to some implementations. In some implementations, the non-legacy PPDU 800 may be one example of the PPDU 600 of FIG. 6. In the example of FIG. 8, the non-legacy PPDU 800 is shown to include an L-STF, an L-LTF, an L-SIG, an RL-SIG, a U-SIG, and an EHT-SIG signaled or transmitted on multiple 20 MHz subchannels (or frequency segments) of a 320 MHz wireless channel. In some other implementations, the wireless channel may encompass any range of frequencies including, but not limited to, a 160 MHz frequency spectrum, a 240 MHz frequency spectrum, a 480 MHz frequency spectrum, or a 640 MHz frequency spectrum. As shown in FIG. 8, the 320 MHz frequency spectrum includes sixteen 20 MHz subchannels indexed from lowest to highest (such as from the $1^{st}$ to the $16^{th}$).

In the example of FIG. 8, L-STF, L-LTF, L-SIG, and RL-SIG are duplicated or repeated in each 20 MHz subchannel spanning the entirety of the 320 MHz frequency spectrum. In some implementations, U-SIG may be duplicated or repeated in each 20 MHz subchannel of a respective 80 MHz segment of the wireless channel. For example, the first four subchannels ($1^{st}$ through $4^{th}$) may share the same U-SIG fields and values. The next four subchannels ($5^{th}$ through $8^{th}$) may share the same U-SIG fields and values, which may be different than the U-SIG fields or values of the previous four subchannels. The next four subchannels ($9^{th}$ through $12^{th}$) may share the same U-SIG fields and values, which in turn may be different than the U-SIG fields or values in any of the previous eight subchannels. The next four subchannels ($13^{th}$ through $16^{th}$) may share the same U-SIG fields and values, which in turn may be different than the U-SIG fields or values in any of the previous twelve subchannels. In other words, the U-SIG fields or values may change every 80 MHz. This may allow for greater parallelization of U-SIG information across the various subchannels.

In some implementations, EHT-SIG may be signaled on a number of content channels. Each content channel may be defined by a particular grouping of subchannels. For example, a first content channel may carry the signaling information for all odd-numbered subchannels (such as the $1^{st}$, $3^{rd}$, $5^{th}$, $7^{th}$, $9^{th}$, $11^{th}$, $13^{th}$, and $15^{th}$ 20 MHz subchannels) and a second content channel may carry the signaling information for all even-numbered subchannels (such as the $2^{nd}$, $4^{th}$, $6^{th}$, $8^{th}$, $10^{th}$, $12^{th}$, $14^{th}$, and $16^{th}$ 20 MHz subchannels). In some implementations, EHT-SIG may be duplicated or repeated per content channel. For example, the (odd-numbered) subchannels associated with the first content channel may share the same EHT-SIG fields and values. The (even-numbered) subchannels associated with the second content channel may share the same EHT-SIG fields and values, which may be different than the EHT-SIG fields or values of the first content channel.

As described above, existing versions of the IEEE 802.11 standards support trigger-based uplink communications. In particular, the IEEE 802.11ax amendment of the IEEE 802.11 standard defines a trigger frame format which can be used to solicit the transmission of TB PPDUs from one or more STAs. The trigger frame allocates resources for the transmission of the TB PPDUs and indicates how the TB PPDUs are to be configured for transmission. As new WLAN communication protocols enable enhanced features, new trigger frame formats are needed to support the new features in TB PPDUs. More specifically, a new trigger frame design is needed to configure and solicit the transmission of TB PPDUs in accordance with the IEEE 802.11be amendment of the IEEE 802.11 standard such as described, for example, with reference to FIGS. 6-8.

Various aspects relate generally to trigger-based communications that support new wireless communication protocols, and more particularly, to trigger frame designs that support enhanced wireless communication features associated with the IEEE 802.11be amendment, and future generations, of the IEEE 802.11 standard. In some aspects, an enhanced trigger frame may be used to solicit a non-legacy TB PPDU from one or more STAs. As used herein, the term "non-legacy" may refer to PPDU formats and communication protocols conforming to the IEEE 802.11be amendment, and future generations, of the IEEE 802.11 standard. In contrast, the term "legacy" may be used herein to refer to PPDU formats and communication protocols conforming to the IEEE 802.11ax amendment of the IEEE 802.11 standard, or earlier generations of the IEEE 802.11 standard, but not conforming to all mandatory features of the IEEE 802.11be amendment, or future generations, of the IEEE 802.11 standard. In some implementations, the enhanced trigger frame may be configurable to support multiple versions of the IEEE 802.11 standard. For example, an enhanced trigger frame may be configured in accordance with a legacy trigger frame format or a non-legacy trigger frame format. Thus, when configured in accordance with the legacy trigger frame format, the enhanced trigger frame can also be used to solicit a legacy TB PPDU from one or more STAs.

Particular implementations of the subject matter described in this disclosure can be implemented to realize one or more of the following potential advantages. By soliciting the transmission of non-legacy TB PPDUs, the enhanced trigger frame may support gains in data throughput achievable in accordance with the IEEE 802.11be amendment of the IEEE 802.11 standard. Among other examples, the enhanced trigger frame of the present implementations may enable non-legacy TB PPDUs to be transmitted over bandwidths of up to 320 MHz, on up to 16 spatial streams. By designing the enhanced trigger frame to support multiple versions of the IEEE 802.11 standard, aspects of the present disclosure may ensure that the enhanced trigger frame format is backwards compatible with existing STAs. As a result, a single trigger frame may be used to concurrently solicit uplink transmissions from STAs operating in accordance with the IEEE 802.11ax amendment of the IEEE 802.11 standard (also referred to herein as "legacy STAs") and STAs operating in accordance with the IEEE 802.11be amendment of the IEEE 802.11 standard (also referred to herein as "non-legacy STAs). More specifically, aspects of the present disclosure provide a single trigger frame design that can be used to solicit legacy and non-legacy PPDUs.

Figure 9:
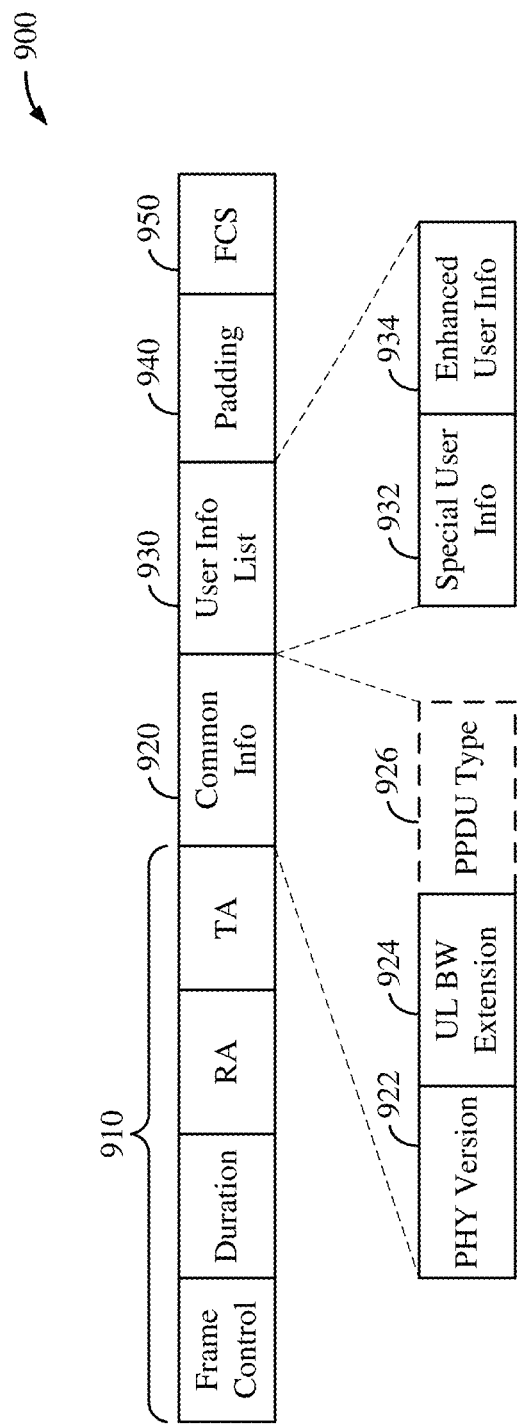
FIG. 9 shows an example trigger frame usable for communications between an AP and a number of STAs according to some implementations.

FIG. 9 shows an example trigger frame 900 usable for communications between an AP and a number of STAs according to some implementations. In some implementations, the trigger frame 900 (also referred to herein as an "enhanced trigger frame") may be used to solicit transmissions of non-legacy PPDUs from one or more non-legacy STAs. In some aspects, the solicited PPDUs may include non-legacy TB PPDUs such as the TB PPDU 700 of FIG. 7A. In some other aspects, the solicited PPDUs may include non-legacy SU PPDUs such as the SU PPDU 710 of FIG. 7B. In some other implementations, the trigger frame 900 also may be used to solicit transmissions of legacy TB PPDUs from one or more legacy STAs. In other words, the enhanced trigger frame format of the present implementations may provide backwards compatibility with the legacy trigger frame format (such as defined by the IEEE 802.11ax amendment of the IEEE 802.11 standards).

The trigger frame 900 includes a MAC header 910, a common information field 920, a user information list 930, zero or more padding bits 940, and an FCS 950. The MAC header 910 includes a frame control field, a duration field, a receiver address (RA) field, and a transmitter address (TA) field. In some implementations, the MAC header 910 may be identical to the MAC header associated with the legacy trigger frame format. The common information field 920 and user information list 930 carry configuration information which may be used by a receiving device to configure an uplink (UL) PPDU to be transmitted responsive to the trigger frame 900. Such configuration information may include UL bandwidth, RU allocation, number of spatial streams, number of LTF symbols, and spatial reuse thresholds, among other examples.

Figure 10A:
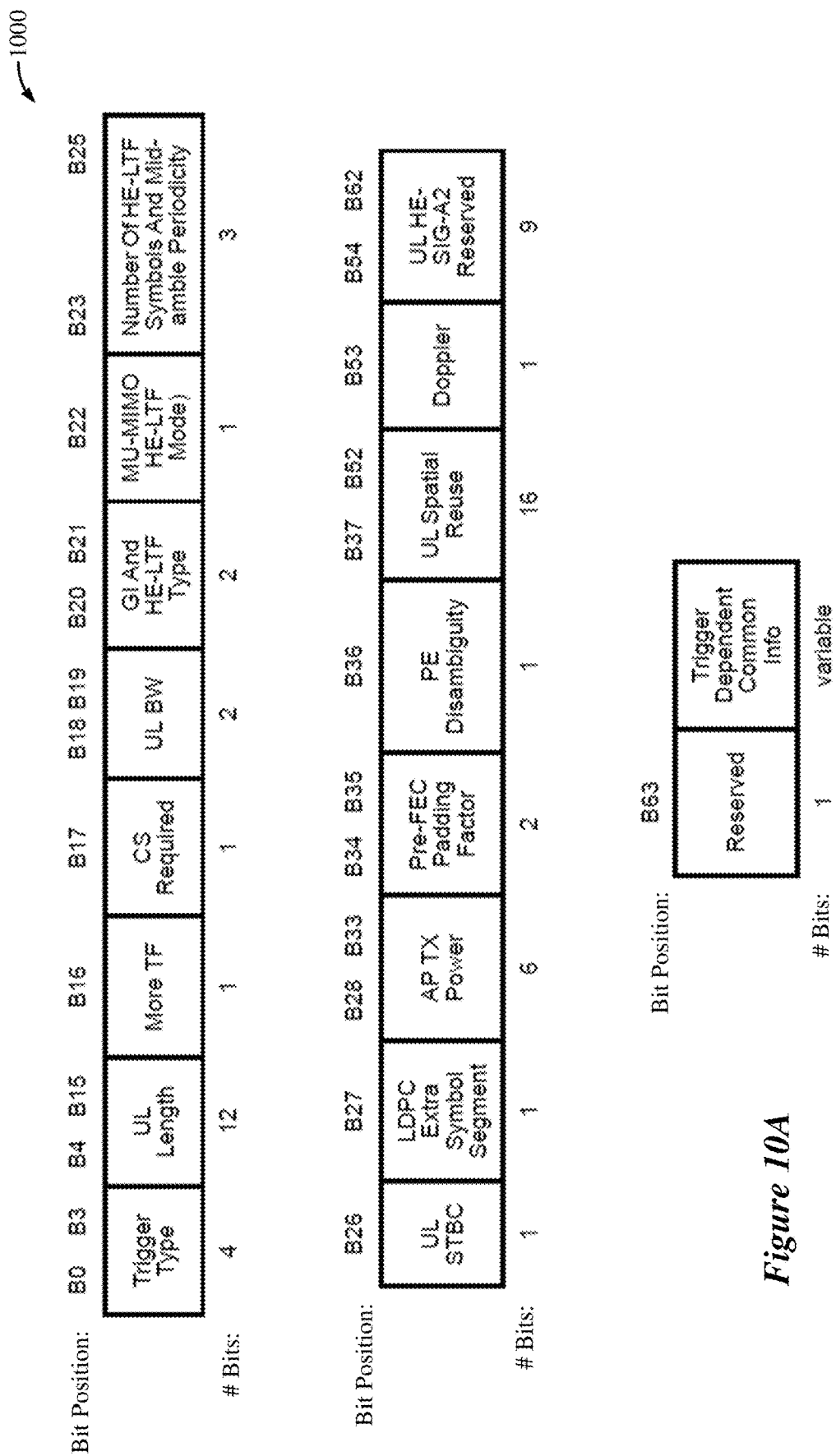
FIG. 10A shows a common information field for a trigger frame formatted in accordance with a legacy trigger frame format.

In some implementations, the common information field 920 may include a PHY version subfield 922 and an uplink (UL) bandwidth (BW) extension subfield 924. The PHY version subfield 922 may carry information indicating a format of the trigger frame 900. In some aspects, the PHY version subfield 922 may include one or more bits indicating whether the trigger frame 900 is configured in accordance with the legacy trigger frame format or a non-legacy trigger frame format. When the information in the PHY version subfield 922 indicates the legacy trigger frame format, the fields and subfields of the trigger frame 900 may be identical to the fields and subfields of the trigger frame format defined by the IEEE 802.11ax amendment of the IEEE 802.11 standard. FIG. 10A shows a common information field 1000 for a trigger frame formatted in accordance with the legacy trigger frame format. When the information in the PHY version subfield 922 indicates the non-legacy trigger field format, the trigger frame 900 may include one or more new (or modified) fields or subfields that support enhanced WLAN communication features such as provided by the IEEE 802.11be amendment of the IEEE 802.11 standard. In some implementations, the PHY version subfield 922 may include multiple (such as 3) bits, some of which may be reserved to support future generations of the IEEE 802.11 standard.

In some implementations, a non-legacy STA may identify the UL BW extension subfield 924 in the common information field 920 responsive to determining that the information in the PHY version subfield 922 indicates the non-legacy trigger frame format. The UL BW extension subfield 924 serves as an extension to a UL BW subfield of the common information field 920. With reference for example to FIG. 10A, the common information field 1000 includes a UL BW subfield spanning bit positions B18 and B19. The UL BW subfield carries 2 bits of information indicating a bandwidth associated with the PPDU solicited by the trigger frame 900. More specifically, the UL BW subfield may have a value of 0, 1, 2, or 3 to indicate a 20 MHz, 40 MHz, 80 MHz, or 160 MHz (or 80+80 MHz) bandwidth, respectively. Aspects of the present disclosure recognize that because the UL BW subfield is limited to 2 bits, it may not be suitable for conveying higher-order bandwidths supported by non-legacy PPDUs. In some implementations, the UL BW extension subfield 924 may carry 1 bit of information that can be combined with the 2 bits carried in the UL BW subfield to expand the uplink bandwidth beyond 160 MHz. More specifically, the UL BW extension subfield extends the number of values associated with the UL BW subfield to 8, allowing for 4 additional bandwidths to be indicated by the trigger frame 900. In some aspects, the additional bandwidths may include at least a 320 MHz bandwidth. In some other aspects, the additional bandwidths may include a 240 MHz bandwidth.

In some implementations, the common information field 920 may further include a PPDU type subfield 926. The PPDU type subfield 926 may carry information indicating a type of PPDU to be transmitted by a non-legacy STA responsive to the trigger frame 900. In some aspects, the PPDU type subfield 926 may include a single bit indicating whether the solicited PPDU is to be an SU PPDU or a TB PPDU. Aspects of the present disclosure recognize that, in some instances, it may be advantageous to allow an AP to control or manage peer-to-peer (P2P) communications between two or more STAs in a BSS. The advantages of AP-managed P2P communications include more efficient use of spectrum and lower communications latency, among other examples. In some aspects, a non-legacy STA may identify the PPDU type subfield 926 responsive to determining that the information in the PHY version subfield 922 indicates the non-legacy trigger frame format. If the non-legacy STA determines that the information in the PPDU type subfield 926 indicates the TB PPDU type, the non-legacy STA may proceed to configure a non-legacy TB PPDU for transmission to the AP which transmitted the trigger frame 900. On the other hand, if the non-legacy STA determines that the information in the PPDU type subfield 926 indicates the SU PPDU type, the non-legacy STA may proceed to configure a non-legacy SU PPDU for transmission to a peer STA. In some implementations, the trigger frame 900 may be sent to a single non-legacy STA when configured to solicit an SU PPDU.

Aspects of the present disclosure recognize that subfields 922-926 are configured to carry new information that did not previously exist in any fields or subfields of the legacy trigger frame format. In some implementations, to ensure backwards compatibility with the legacy trigger frame format, one or more of the subfields 922-926 may be implemented using one or more reserved bits associated with the legacy trigger frame format. With reference for example to FIG. 10A, the common information field 1000 of the legacy trigger frame format includes 10 reserved bits, at bit positions B54-B56, B63, and B39. In some implementations, the PHY version subfield 922 may replace or overlap 3 reserved bits of the common information field 1000. In some other implementations, the UL BW extension subfield 924 may replace or overlap another reserved bit of the common information field 1000. Still further, in some implementations, the PPDU type subfield 926 may replace or overlap yet another reserved bit of the common information field 1000.

In some implementations, a wireless channel may be punctured to exclude one or more subchannels from the transmission of a PPDU, for example, to avoid interference (such as from an incumbent system transmission) on the punctured subchannels. More specifically, channel puncturing may be specified at a 20 MHz granularity relative to a respective 80 MHz segment of the overall bandwidth. With reference for example to FIG. 8, a first set of puncture channel information may indicate which (if any) of the $1^{st}$, $2^{nd}$, $3^{rd}$, or $4^{th}$ 20 MHz subchannels is punctured in the first 80 MHz segment, a second set of punctured channel information may indicate which (if any) of the $5^{th}$, $6^{th}$, $7^{th}$, or $8^{th}$ 20 MHz subchannels is punctured in the second 80 MHz segment, a third set of punctured channel information may indicate which (if any) of the $9^{th}$, $10^{th}$, $11^{th}$, or $12^{th}$ 20 MHz subchannels is punctured in the third 80 MHz segment, and a fourth set of punctured channel information may indicate which (if any) of the $13^{th}$, $14^{th}$, $15^{th}$, or $16^{th}$ 20 MHz subchannels is punctured in the fourth 80 MHz segment.

To differentiate the punctured subchannels of an 80 MHz segment from the punctured subchannels of another 80 MHz segment, each set of punctured channel information may be represented by a respective set of 4 bits. In other words, 16 bits are needed to provide punctured channel indications for bandwidths of up to 320 MHz. Thus, to support such punctured channel indications, it may be desirable to add a 16-bit subfield to the common information field 920. However, as shown in FIG. 10A, only 10 reserved bits are available in the common information field 1000 of the legacy trigger frame format (even fewer reserved bits are available after implementing one or more of the subfields 922, 924, or 926). Accordingly, the punctured channel information cannot be adequately conveyed using only the reserved bits of the common information field 1000. In some implementations, the punctured channel information may be added to the trigger frame 900 by "spoofing" one or more user information fields in the user information list 930. For example, in some aspects, the user information list 930 may include one or more special user information fields 932 that can be used as an extension of the common information field 920.

Figure 10B:
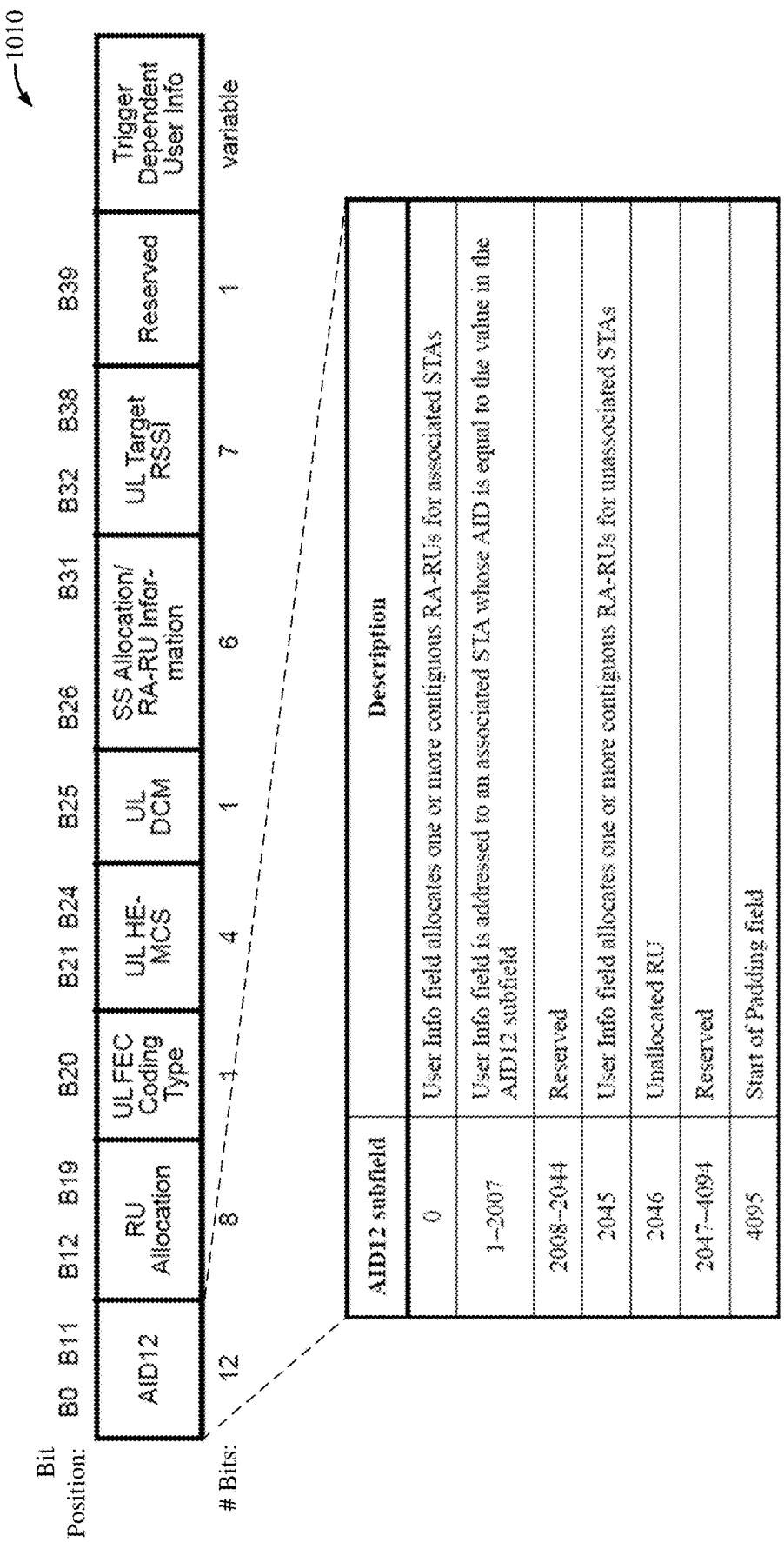
FIG. 10B shows a user information field for a trigger frame formatted in accordance with a legacy trigger frame format.

According to the IEEE 802.11ax amendment of the IEEE 802.11 standard, a user information list is defined to include zero or more user information fields. FIG. 10B shows a user information field 1010 for a trigger frame formatted in accordance with the legacy trigger frame format. With reference for example to FIG. 10B, each user information field is associated with a unique association identifier (AID) value. The AID value may be a 12-bit value carried in the AID12 subfield (bit positions B0-B11) of a user information field. In some instances, the AID value may uniquely identify a particular STA in a BSS. For example, each STA may be assigned a unique AID value upon associating with the BSS. Aspects of the present disclosure recognize that several values associated with the AID12 subfield are reserved (such as 2008-2044 and 2047-4094). Thus, in some implementations, a special user information field 932 may be assigned one of the reserved values associated with the AID12 subfield. By using a reserved value for its AID12 subfield, the special user information field 932 may be ignored by legacy STAs and identified by non-legacy STAs responsive to determining that the information in the PHY version subfield 922 indicates the non-legacy trigger frame format.

In some implementations, the special user information field 932 may be the first user information field in a series of information fields included in the user information list 930. In other words, the special user information field 932 may immediately follow the common information field 920 in the trigger frame 900. In some implementations, every trigger frame 900 configured in accordance with the non-legacy format may include at least one special user information field 932. In some other implementations, the special user information field 932 may be included in the trigger frame 900 only as needed. For example, in some instances, there may not be any punctured subchannels associated with the UL bandwidth. In such instances, it may be unnecessary to include any channel puncturing information in the special user information field 932. Accordingly, the special user information field 932 may be omitted from the trigger frame 900, for example, to reduce overhead.

Figure 11:
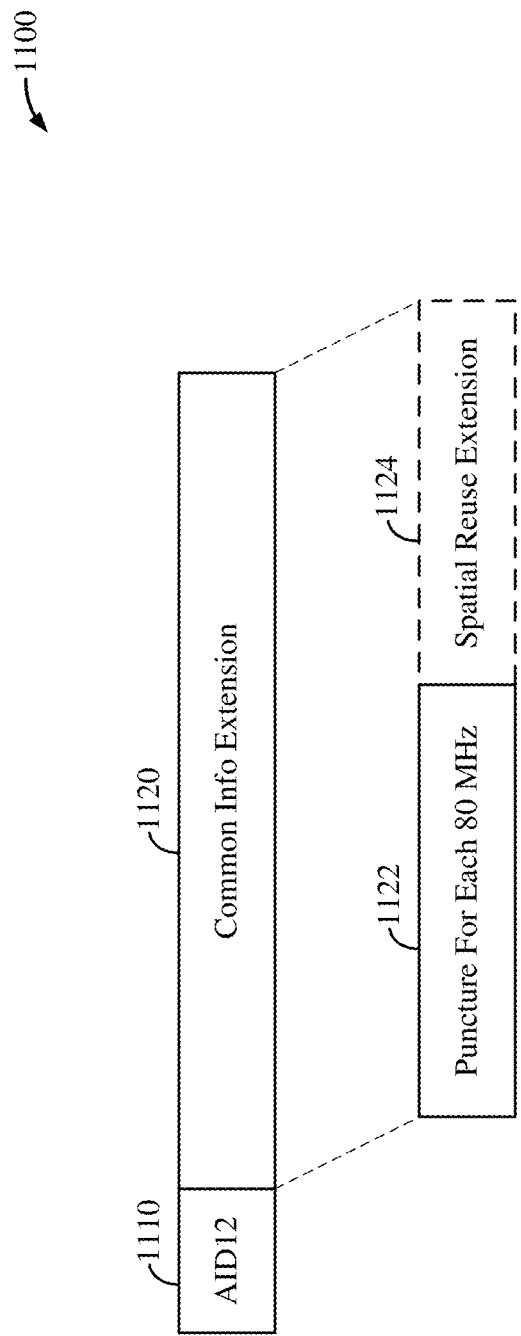
FIG. 11 shows an example special user information field according to some implementations.

FIG. 11 shows an example special user information field 1100 according to some implementations. In some implementations, the special user information field 1100 may be one example of the special user information field 932 of FIG. 9. Accordingly, the special user information field 1100 may be used as an extension of the common information field of an enhanced trigger frame. More specifically, the special user information field 1100 includes an AID12 subfield 1110 and one or more common information extension bits 1120. As described above with reference to FIGS. 9 and 10B, the AID12 subfield 1110 may be one example of the AID12 subfield (in bit positions B0-B11) of the user information field 1010 of the legacy trigger frame format. In some implementations, the AID12 subfield 1110 may be assigned a "special" AID value that is not assigned to any STAs belonging to the BSS associated with the underlying trigger frame. For example, in some aspects, the special AID value may represent a reserved AID value associated with the legacy trigger frame format (such as 2008-2044 and 2047-4094).

The common information extension bits 1120 may include any of the remaining bits associated with a user information field. In other words, the length of the special user information field 1100 may be equal to the length of any other user information field in the user information list (such as the user information field 1010 of FIG. 10B). With reference for example to FIG. 10B, the common information extension bits 1220 may include bits B12-B39 of the user information field 1010. Accordingly, the special user information field 1100 may allocate an additional 28 bits that can be used as an extension for the common information field. In some implementations, at least some of the common information extension bits 1220 may be associated with a per-80 MHz puncturing subfield 1122 (also referred to as a "puncture for each 80 MHz" subfield). The per-80 MHz puncturing subfield 1122 may carry information indicating which (if any) 20 MHz subchannels of the UL bandwidth are punctured. In some aspects, the per-80 MHz puncturing subfield 1122 may include 16 bits indicating, for each 80 MHz segment of a 320 MHz channel, whether any of the 20

MHz subchannels within that 80 MHz segment are punctured (such as described above with reference to FIGS. 9 and 8).

In some implementations, the common information extension bits 1120 may further include a spatial reuse extension subfield 1124. The spatial reuse extension subfield 1124 may serve as an extension to a UL spatial reuse subfield of the common information field. With reference for example to FIG. 10A, the common information field 1000 includes a UL spatial reuse subfield spanning bit positions B37 through B52. The UL spatial reuse subfield carries 16 bits of information associated with 4 spatial reuse values. Each spatial reuse value is a 4-bit value representing a respective parameterized spatial reuse (PSR) threshold. When the trigger frame is transmitted to a legacy STA, the legacy STA copies the spatial reuse values from the UL spatial reuse subfield directly into the HE-SIG-A field of a legacy TB PPDU. However, each spatial reuse value in the UL spatial reuse subfield is associated with a respective 40 MHz subchannel. Aspects of the present disclosure recognize that because the UL spatial reuse subfield is limited to 4 spatial reuse values, it may not be well-suited for conveying spatial reuse information for higher-order bandwidths supported by non-legacy TB PPDUs. In some implementations, additional spatial reuse information may be carried in the spatial reuse extension subfield 1124 of the special user information field 1100. A non-legacy STA may combine the spatial reuse values in the UL spatial reuse subfield with the additional spatial reuse information in the spatial reuse extension subfield 1124 to determine the spatial reuse values to be included in the U-SIG field of a non-legacy TB PPDU.

Figure 12A:
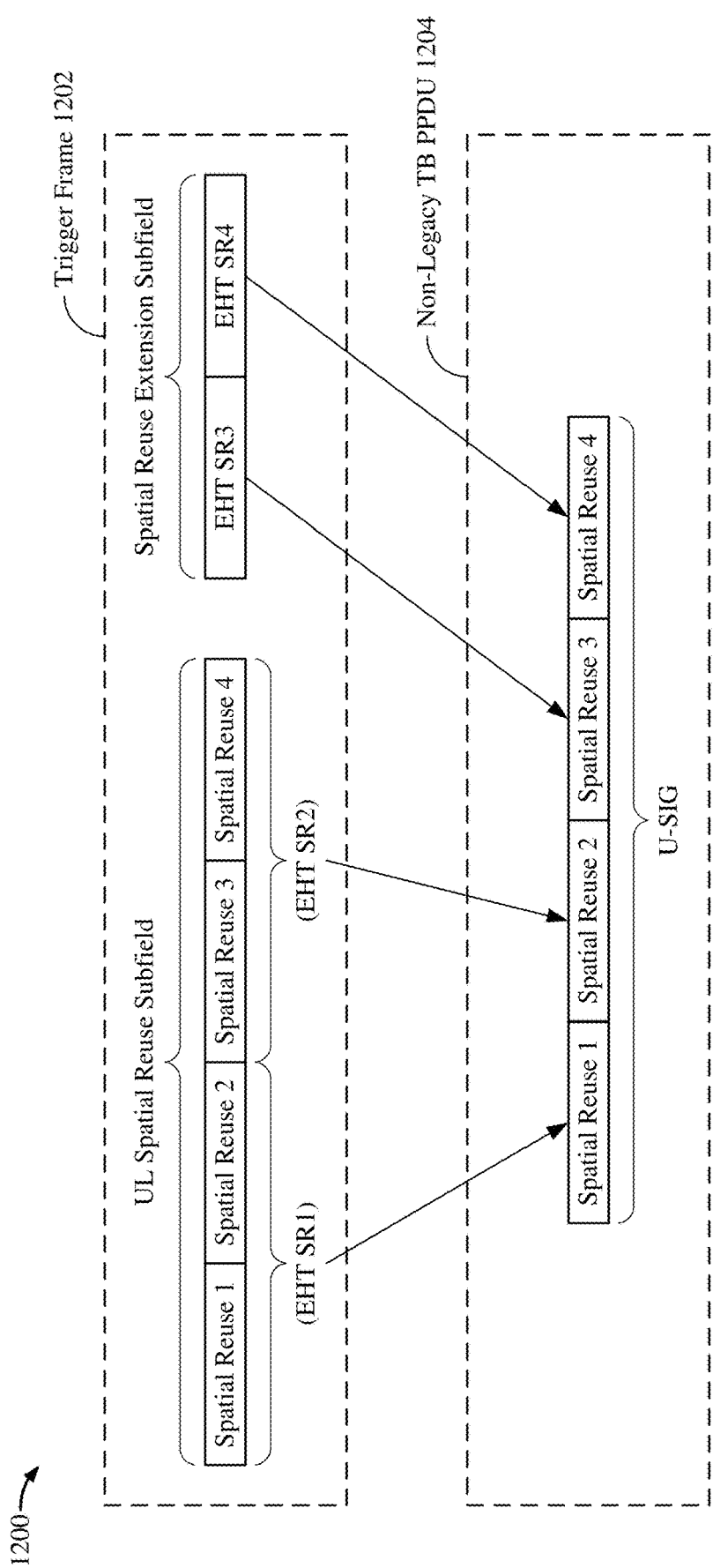
FIG. 12A shows an example mapping of spatial reuse values between a trigger frame and a non-legacy TB PPDU according to some implementations.

FIG. 12A shows an example mapping 1200 of spatial reuse values between a trigger frame 1202 and a non-legacy TB PPDU 1204 according to some implementations. In the example of FIG. 12A, the trigger frame 1202 includes a UL spatial reuse subfield carrying 4 spatial reuse values (spatial reuse 1, spatial reuse 2, spatial reuse 3, and spatial reuse 4) and a spatial reuse extension subfield carrying 2 non-legacy spatial reuse values (EHT SR3 and EHT SR4). The non-legacy TB PPDU 1204 includes a U-SIG field carrying 4 spatial reuse values (spatial reuse 1, spatial reuse 2, spatial reuse 3, and spatial reuse 4). To support spatial reuse for a 320 MHz channel, each of the spatial reuse values in U-SIG must be associated with a respective 80 MHz subchannel. However, as described above with reference to FIG. 11, each spatial reuse value in the UL spatial reuse subfield is associated with a respective 40 MHz channel.

In some implementations, a non-legacy STA may compensate for differences between the spatial reuse values in the UL spatial reuse subfield of the trigger frame 202 and the spatial reuse values in the U-SIG field of the non-legacy TB PPDU 1204 by combining pairs of spatial reuse values in the UL spatial reuse subfield to form respective non-legacy spatial reuse values. For example, the first and second spatial reuse values (spatial reuse 1 and spatial reuse 2) may each be set to a first PSR threshold. As such, the first PSR threshold may represent a first non-legacy spatial reuse value (EHT SR1) associated with a first 80 MHz subchannel spanning the 40 MHz subchannels associated with the first and second spatial reuse values. Similarly, the third and fourth spatial reuse values (spatial reuse 3 and spatial reuse 4) may each be set to a second PSR threshold. As such, the second PSR threshold may represent a second non-legacy spatial reuse value (EHT SR2) associated with a second 80 MHz subchannel spanning the 40 MHz subchannels associated with the third and fourth spatial reuse values. In some aspects, EHT SR1 and EHT SR2 may represent respective PSR thresholds for a primary 160 MHz channel.

In some implementations, the PSR thresholds for a secondary 160 MHz channel may be provided by the non-legacy spatial reuse values in the spatial reuse extension subfield. More specifically, EHT SR3 and EHT SR4 may represent PSR thresholds for respective 80 MHz subchannels of the secondary 160 MHz channel. Thus, in some aspects, the spatial reuse values in U-SIG may inherent 2 non-legacy spatial reuse values from the UL spatial reuse subfield (EHT SR1 and EHT SR2) and another 2 non-legacy spatial reuse thresholds from the spatial reuse extension subfield (EHT SR3 and EHT SR4). For example, as shown in FIG. 12A, the non-legacy STA may copy one of the first or second spatial reuse values from the UL spatial reuse subfield into the first spatial reuse value of U-SIG (since spatial reuse 1 and spatial reuse 2 represent the same PSR threshold), and may copy one of the third or fourth spatial reuse values from the UL spatial reuse subfield into the second spatial reuse value of U-SIG (since spatial reuse 3 and spatial reuse 4 represent the same PSR threshold). Further, the non-legacy STA may copy EHT SR3 from the spatial reuse extension subfield into the third spatial reuse value of U-SIG, and may copy EHT SR4 of the spatial reuse extension subfield into the fourth spatial reuse value of U-SIG.

As described above with reference to FIG. 11, the spatial reuse extension subfield can be included in a special user information field. In some implementations, EHT SR3 and EHT SR4 may each represent a 4-bit value. As such, the spatial reuse extension subfield adds only 8 bits of overhead to the special user information field. As described above with reference to FIG. 11, the special user information field 1100 includes 28 common information extension bits 1120 that can be allocated to the per-80 MHz puncturing subfield 1122 or the spatial reuse extension subfield 1124. In some implementations, because the per-80 MHz puncturing subfield 1122 occupies only 16 bits, the spatial reuse extension subfield 1124 may be combined with the per-80 MHz puncturing subfield 1122 in a single special user information field 1100 (leaving 4 unused common information extension bits 1120). In some other implementations, the per-80 MHz puncturing subfield 1122 and the spatial reuse extension subfield 1124 may be carried in separate special user information fields 1100.

Figure 12B:
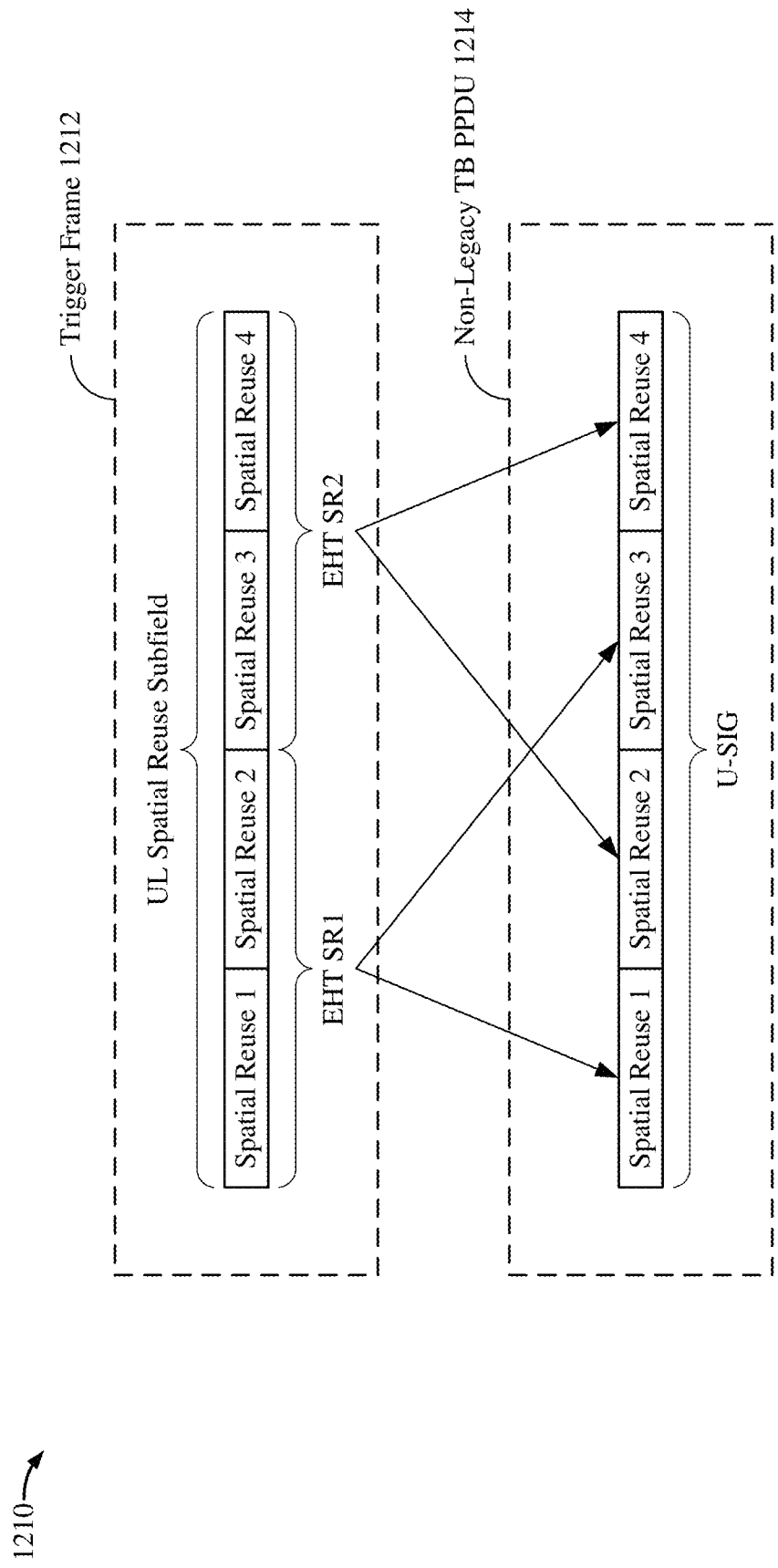
FIG. 12B shows an example mapping of spatial reuse values between a trigger frame and a non-legacy TB PPDU according to some other implementations.

FIG. 12B shows an example mapping 1210 of spatial reuse values between a trigger frame 1212 and a non-legacy TB PPDU 1214 according to some other implementations. In the example of FIG. 12B, the trigger frame 1212 includes a UL spatial reuse subfield carrying 4 spatial reuse values (spatial reuse 1, spatial reuse 2, spatial reuse 3, and spatial reuse 4). However, unlike the trigger frame 1210 of FIG. 12A, trigger frame 1212 does not include a spatial reuse extension subfield. The non-legacy TB PPDU 1214 includes a U-SIG field carrying 4 spatial reuse values (spatial reuse 1, spatial reuse 2, spatial reuse 3, and spatial reuse 4). To support spatial reuse for a 320 MHz channel, each of the spatial reuse values in U-SIG must be associated with a respective 80 MHz subchannel. However, as described above with reference to FIG. 11, each spatial reuse value in the UL spatial reuse subfield is associated with a respective 40 MHz channel.

In some implementations, a non-legacy STA may compensate for differences between the spatial reuse values in the UL spatial reuse subfield of the trigger frame 212 and the spatial reuse values in the U-SIG field of the non-legacy TB PPDU 1214 by combining pairs of spatial reuse values in the UL spatial reuse subfield to form respective non-legacy spatial reuse values. For example, the first and second spatial reuse values (spatial reuse 1 and spatial reuse 2) may each be set to a first PSR threshold. As such, the first PSR threshold may represent a first non-legacy spatial reuse value (EHT SR1) associated with a first 80 MHz subchannel spanning the 40 MHz subchannels associated with the first and second spatial reuse values. Similarly, the third and fourth spatial reuse values (spatial reuse 3 and spatial reuse 4) may each be set to a second PSR threshold. As such, the second PSR threshold may represent a second non-legacy spatial reuse value (EHT SR2) associated with a second 80 MHz subchannel spanning the 40 MHz subchannels associated with the third and fourth spatial reuse values. In some aspects, EHT SR1 and EHT SR2 may represent respective PSR thresholds for a primary 160 MHz channel.

In some implementations, the PSR thresholds for the primary 160 MHz channel may be duplicated on a secondary 160 MHz channel. Thus, in some aspects, the spatial reuse values in U-SIG may inherent all 4 non-legacy spatial reuse values from the UL spatial reuse subfield (EHT SR1 and EHT SR2). For example, as shown in FIG. 12B, the non-legacy STA may copy one of the first or second spatial reuse values from the UL spatial reuse subfield into the first spatial reuse value of U-SIG (since spatial reuse 1 and spatial reuse 2 represent the same PSR threshold), and may copy one of the third or fourth spatial reuse values from the UL spatial reuse subfield into the second spatial reuse value of U-SIG (since spatial reuse 3 and spatial reuse 4 represent the same PSR threshold). Further, the non-legacy STA may copy one of the first or second spatial reuse values from the UL spatial reuse subfield into the third spatial reuse value of U-SIG, and may copy one of the third or fourth spatial reuse values from the UL spatial reuse subfield into the fourth spatial reuse value of U-SIG.

In some implementations, a non-legacy PPDU may be transmitted over multiple spatial streams. More specifically, the IEEE 802.11be amendment of the IEEE 802.11 standard extends the number of supported spatial streams to 16. As described above with reference to FIG. 6, a non-legacy PPDU may include one or more EHT-LTFs which enable a receiving device to perform fine timing and frequency estimation and also to acquire an estimate of the wireless channel. For accurate channel estimation, the number of EHT-LTF symbols must be equal to or greater than the number of spatial streams on which the non-legacy PPDU is transmitted. However, the legacy trigger frame format is only configured to support up to 8 HE-LTF symbols. With reference for example to FIG. 10A, the common information field 1000 includes a number of HE-LTF symbols and midamble periodicity subfield spanning bit positions B23 through B25. Table 1 shows a listing of values associated with the number of HE-LTF symbols and midamble periodicity subfield as defined by the IEEE 802.11ax amendment of the IEEE 802.11 standard.

TABLE 1

| Number of HE-LTF Symbols and Midamble Periodicity Subfield Value | # HE-LTF Symbols for Doppler = 0 | # HE-LTF Symbols (and Midamble Periodicity) for Doppler = 1 |
| --- | --- | --- |
| 0 | 1 | 1 (10 Symbols) |
| 1 | 2 | 2 (10 Symbols) |
| 2 | 4 | 4 (10 Symbols) |
| 3 | 6 | Reserved |
| 4 | 8 | 1 (20 Symbols) |

TABLE 1-continued

| Number of HE-LTF Symbols and Midamble Periodicity Subfield Value | # HE-LTF Symbols for Doppler = 0 | # HE-LTF Symbols (and Midamble Periodicity) for Doppler = 1 |
| --- | --- | --- |
| 5 | Reserved | 2 (20 Symbols) |
| 6 | Reserved | 4 (20 Symbols) |
| 7 | Reserved | Reserved |

As shown in Table 1, the number of HE-LTF symbols and midamble periodicity subfield values of 0, 1, 2, 3, and 4 are used to indicate 1, 2, 4, 6, and 8 HE-LTF symbols, respectively. Aspects of the present disclosure recognize that, because the number of HE-LTF symbols and midamble periodicity subfield carries 3 bits of information, there are a sufficient number of bits in the existing subfield to support up to 16 EHT-LTF symbols. For example, Table 1 contains a number of reserved values for the number of HE-LTF symbols and midamble periodicity subfield. In some implementations, the 3 bits of the number of HE-LTF symbols and midamble periodicity subfield can be reused to indicate up to 16 EHT-LTF symbols, for example, as shown in Table 2.

TABLE 2

| Number of HE-LTF Symbols and Midamble Periodicity Subfield Value | # EHT-LTF Symbols for Doppler = 0 | # EHT-LTF Symbols (and Midamble Periodicity) for Doppler = 1 |
| --- | --- | --- |
| 0 | 1 | 1 (10 Symbols) |
| 1 | 2 | 2 (10 Symbols) |
| 2 | 4 | 4 (10 Symbols) |
| 3 | 6 | Reserved |
| 4 | 8 | 1 (20 Symbols) |
| 5 | 12 | 2 (20 Symbols) |
| 6 | 16 | 4 (20 Symbols) |
| 7 | Reserved | Reserved |

As shown in Table 2, the number of HE-LTF symbols and midamble periodicity subfield values of 5 and 6 may be used to indicate that a solicited non-legacy PPDU is to include 12 and 16 EHT-LTF symbols, respectively. The same subfield values are reserved in the legacy trigger frame format. Thus, the additional numbers of EHT-LTF symbols may replace one or more reserved values associated with the number of HE-LTF symbols and midamble periodicity subfield of the legacy trigger frame format. With reference for example to FIG. 9, a non-legacy STA may interpret the number of HE-LTF symbols and midamble periodicity subfield values of 5 and 6 to indicate 12 and 16 EHT-LTF symbols, respectively, responsive to determining that the information in the PHY version subfield 922 indicates the non-legacy trigger frame format.

In addition to indicating the number of EHT-LTF symbols needed to support up to 16 spatial streams, an enhanced trigger frame must also indicate how the spatial streams are allocated. Because a trigger frame may solicit non-legacy PPDUs from multiple STAs, spatial stream allocation information may be user specific. Accordingly, the spatial stream allocation information may be carried in one or more user information fields. With reference for example to FIG. 10B, spatial stream allocation information may be carried in a spatial stream (SS) allocation and random-access resource unit (RA-RU) information subfield spanning bits B26 and B31 of the user information field 1010 of the legacy trigger frame format. As shown in FIG. 10B, the SS allocation and RA-RU information subfield carries 6 bits of information, 3 of which are used to indicate a starting spatial stream and the remaining 3 bits are used to indicate the number of spatial streams. Aspects of the present disclosure recognize that because only 3 bits of the SS allocation and RA-RU information subfield can be used to indicate the number of spatial streams (for a maximum of 8 spatial streams), the subfield may not be suitable for conveying greater numbers of spatial streams supported by non-legacy PPDUs.

To provide support for up to 16 spatial streams, at least 4 bits are needed to indicate the number of spatial streams and another 4 bits may be needed to indicate all 16 possible starting stream indices. Accordingly, the SS allocation and RA-RU information subfield would need to be extended by 2 bits. However, as shown in FIG. 10B, the user information field 1010 includes only 1 reserved bit (in bit position B39). Thus, further modifications are needed to support up to 16 spatial streams while still maintaining backwards compatibility with the legacy trigger frame format. With reference for example to FIG. 9, in some implementations, the enhanced trigger frame 900 may include one or more enhanced user information fields 934 in the user information list 930. Similar to the trigger frame 900 itself, the enhanced user information field 934 may be configured in accordance with multiple formats including, for example, a single-user (SU) format and a multi-user (MU) format. In some aspects, the enhanced user information field 934 may be configured to support the transmission of non-legacy PPDUs on up to 16 spatial streams. However, the subfields within the enhanced user information field 934 may vary depending on whether the enhanced user information field 934 is configured in accordance with the SU format or the MU format.

Aspects of the present disclosure recognize that, although the user information field 1010 includes an RU allocation subfield (spanning bit positions B12 through B19), the information in the RU allocation subfield does not indicate whether the RUs are allocated for a single user or multiple users. Aspects of the present disclosure further recognize that the maximum number of spatial streams that can be allocated per non-legacy PPDU may vary depending on whether the RU allocation is intended for one or multiple users. For example, when the RU allocation is for a single user, the solicited non-legacy PPDU can be transmitted on up to 16 spatial streams, while the starting spatial stream index is not needed. However, when the RU allocation is for multiple users, each solicited non-legacy PPDU can be transmitted on a maximum of 4 spatial streams. In some implementations, where the RU allocation information is associated with a single user, the spatial stream allocation information may be carried in an enhanced user information field 934 configured in accordance with the SU format. In some other implementations, where the RU allocation information is associated with multiple users, the spatial stream allocation information may be carried in an enhanced user information field 934 configured in accordance with the MU format. As a result, the overhead of each enhanced user information field 934 may be reduced while providing adequate support for up to 16 spatial streams.

Figure 13:
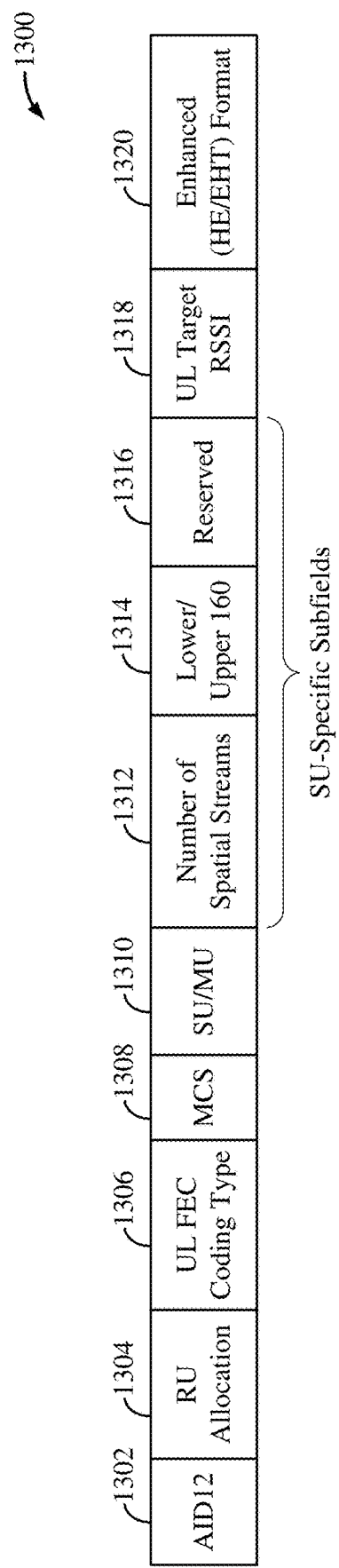
FIG. 13 shows an example enhanced user information field according to some implementations.

FIG. 13 shows an example enhanced user information field 1300 according to some implementations. In some implementations, the enhanced user information field 1300 may be one example of the enhanced user information field 934 of FIG. 9. Accordingly, the enhanced user information field 1300 may be configured in accordance with a SU format or an MU format. In the example of FIG. 13, the enhanced user information field 1300 is shown to be configured in accordance with the SU format.

The enhanced user information field 1300 includes an AID12 subfield 1302, an RU allocation subfield 1304, a UL FEC coding type subfield 1306, an MCS subfield 1308, an SU/MU subfield 1310, a number of spatial streams subfield 1312, a lower/upper 160 subfield 1314, a reserved bit 1316, a UL target RSSI subfield 1318, and an enhanced format subfield 1320. In the example of FIG. 13, the number of spatial streams subfield 132, the lower/upper 160 subfield 134, and the reserved bit 1316 represent SU-specific subfields that are absent from the MU format of the enhanced user information field. With reference for example to FIG. 10B, the SU/MU subfield 1310 may replace the UL dual carrier modulation (DCM) subfield in bit position B25 of the user information field 1010, the SU-specific subfields 1312-1316 may replace the SS allocation and RA-RU information subfield in bit positions B26 through B31 of the user information field 1010, and the enhanced format subfield 1320 may replace the reserved bit B39 of the user information field 1010. The remaining subfields 1302-1308 and 1318 may be substantially similar, if not identical, to similarly-named subfields of the user information field 1010.

The RU allocation subfield 1304 may carry 8 bits of information indicating one or more RUs to be allocated for the transmission of the solicited PPDU. In some implementations, the information in the RU allocation subfield 1304 also may be used to indicate whether the solicited PPDU is to be a non-legacy TB PPDU or a non-legacy SU PPDU. As described above with reference to FIG. 9, in some aspects, an AP may control or manage P2P communications between two or more STAs in a BSS. If a non-legacy STA determines that the information in the RU allocation subfield 1304 indicates the TB PPDU type, the non-legacy STA may proceed to configure a non-legacy TB PPDU for transmission to the AP. On the other hand, if the non-legacy STA determines that the information in the RU allocation subfield 1304 indicates the SU PPDU type, the non-legacy STA may proceed to configure a non-legacy SU PPDU for transmission to a peer STA.

In some implementations, the SU/MU subfield 1310 may carry a single bit of information indicating whether the enhanced user information field 1300 is configured in accordance with the SU format or the MU format. More specifically, the information in the SU/MU subfield 1310 may indicate whether the RU allocation indicated in the RU allocation subfield 1304 is intended for a single user or multiple users. In the example of FIG. 13, the SU/MU subfield 1310 may be configured to indicate the SU format. In some aspects, the SU/MU subfield 1310 may signal how the other subfields of the enhanced user information field 1300 are to be interpreted. For example, a non-legacy STA may identify the SU-specific subfields 1312-1316 in the enhanced user information field 1300 responsive to determining that the SU/MU subfield 1310 indicates the SU format.

As described above, the SU/MU subfield 1310 may replace the UL DCM subfield of the user information field 1010 of the legacy trigger frame format. In some implementations, the DCM information that would have otherwise been carried in the UL DCM subfield (indicating whether DCM is to be used in the transmission of the solicited PPDU) is instead merged into the MCS subfield 1308. For example, DCM may be used only in conjunction with the lowest supported data rate (such as MCS0). Further, aspects of the present disclosure recognize that one or more values of the MCS subfield are reserved in the user information field 1010 of the legacy trigger frame format. Thus, in some aspects, the DCM information may replace one of the reserved MCS values associated with the legacy trigger frame format.

In some implementations, the number of spatial streams subfield 1312 may carry 4 bits of information indicating a number of spatial streams on which the solicited PPDU is to be transmitted. More specifically, with 4 bits of information, the number of spatial streams subfield 1312 can be configured to support up to 16 spatial streams. Because the RU allocation indicated in the RU allocation subfield 1304 is intended for a single user, the index of the starting spatial stream may not be needed. Accordingly, such information may be omitted from the enhanced user information field 1300 to reduce overhead.

In some implementations, the lower/upper 160 subfield 1314 may carry a single bit of information indicating whether the RU allocation indicated by the RU allocation subfield 1304 is associated with a lower 160 MHz segment or an upper 160 MHz segment of a 320 MHz channel. For example, because the legacy trigger frame format only supported RU allocations for a 160 MHz channel, the allocation of RUs as indicated in the allocation subfield 1304 may be constrained to a 160 MHz segment of a 320 MHz channel. Thus, the information in the lower/upper 160 subfield 1314 may be used to distinguish between the lower 160 MHz segment and the upper 160 MHz segment. In some implementations, the RU allocation information may allocate multiple RUs to a single user, for example, as a multi-RU (M-RU). In some instances, an M-RU may span the lower 160 MHz segment and the upper 160 MHz segment. For example, one or more RUs of the M-RU may be located in the lower 160 MHz segment and one or more RUs of the M-RU may be located in the upper 160 MHz segment. In such instances, the M-RU may be indicated by convention to be associated with either the lower 160 MHz segment or the upper 160 MHz segment.

As described above, the number of spatial streams subfield 1312 and the lower/upper 160 subfield 1314 may represent a combined 5 bits of information. With reference for example to FIG. 10B, the SS allocation and RA-RU information subfield of the user information field 1010 carries 6 bits of information. Because the SU-specific subfields 1312-1316 replace the SS allocation and RA-RU information subfield, that leaves one reserved bit 1316 in the enhanced user information field 1300.

In some implementations, the enhanced format subfield 1320 (which may also be referred to as an "HE/EHT" subfield) may carry a single bit of information indicating whether the solicited PPDU is to be a legacy TB PPDU or a non-legacy TB PPDU. In other words, a non-legacy STA may be required to transmit a legacy TB PPDU responsive to receiving an enhanced trigger frame even though the trigger frame is configured in accordance with the non-legacy trigger frame format. This may provide an even finer granularity of control over the type of PPDU that can be solicited and the type of STA that a PPDU can be solicited from.

Figure 14:
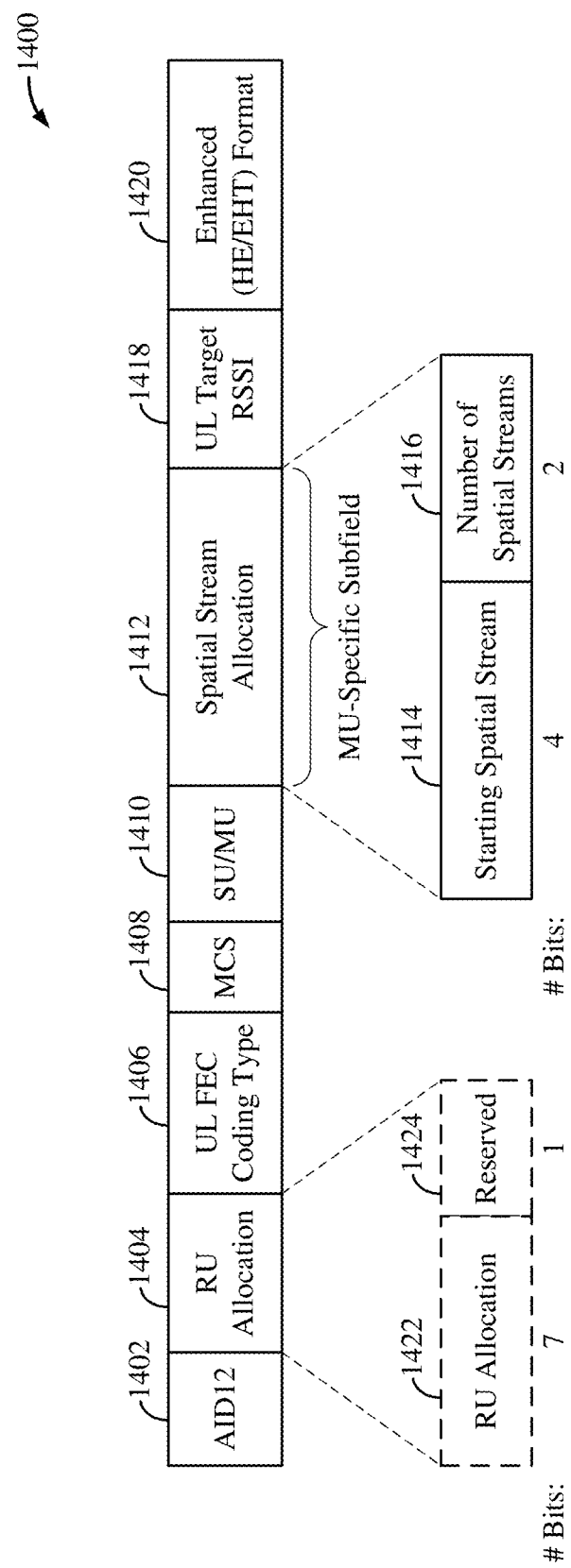
FIG. 14 shows an example enhanced user information field according to some other implementations.

FIG. 14 shows another example enhanced user information field 1400 according to some other implementations. In some implementations, the enhanced user information field 1400 may be one example of the enhanced user information field 934 of FIG. 9. Accordingly, the enhanced user information field 1400 may be configured in accordance with a SU format or an MU format. In the example of FIG. 14, the enhanced user information field 1400 is shown to be configured in accordance with the MU format.

The enhanced user information field 1400 includes an AID12 subfield 1402, an RU allocation subfield 1404, a UL FEC coding type subfield 1406, an MCS subfield 1408, an SU/MU subfield 1410, a spatial stream allocation subfield 1412, a UL target RSSI subfield 1418, and an enhanced format subfield 1420. In the example of FIG. 14, spatial stream allocation subfield 1412 represents an MU-specific subfield that is absent from the SU format of the enhanced user information field. With reference for example to FIG. 10B, the SU/MU subfield 1410 may replace the UL DCM subfield in bit position B25 of the user information field 1010, the spatial stream allocation subfield 1412 may replace the SS allocation and RA-RU information subfield in bit positions B26 through B31 of the user information field 1010, and the enhanced format subfield 1420 may replace the reserved bit B39 of the user information field 1010. The remaining subfields 1402-1408 and 1418 may be substantially similar, if not identical, to similarly-named subfields of the user information field 1010.

The RU allocation subfield 1404 may carry 8 bits of information indicating one or more RUs to be allocated for the transmission of the solicited PPDU. Aspects of the present disclosure recognize that RU allocations for multiple users tend to include larger RUs, resulting in fewer possible RU combinations. Accordingly, the 8 bits of information in the RU allocation subfield 1404 may be sufficient to support RU allocations for a full 320 MHz channel. In some implementations, only 7 bits may be needed to support all possible RU allocations for multiple users. In such implementations, the 8-bit RU allocation subfield 1404 may be replaced by a 7-bit RU allocation subfield 1422 plus a reserved bit 1424, for example, as further shown in FIG. 14.

In some implementations, the SU/MU subfield 1410 may carry a single bit of information indicating whether the enhanced user information field 1400 is configured in accordance with the SU format or the MU format. More specifically, the information in the SU/MU subfield 1410 may indicate whether the RU allocation indicated in the RU allocation subfield 1404 is intended for a single user or multiple users. In the example of FIG. 14, the SU/MU subfield 1410 may be configured to indicate the MU format. In some aspects, the SU/MU subfield 1410 may signal how the other subfields of the enhanced user information field 1400 are to be interpreted. For example, a non-legacy STA may identify the MU-specific subfield 1412 in the enhanced user information field 1400 responsive to determining that the SU/MU subfield 1410 indicates the MU format.

As described above, the SU/MU subfield 1410 may replace the UL DCM subfield of the user information field 1010 of the legacy trigger frame format. In some implementations, the DCM information that would have otherwise been carried in the UL DCM subfield (indicating whether DCM is to be used in the transmission of the solicited PPDU) is instead merged into the MCS subfield 1408. For example, DCM may be used only in conjunction with the lowest supported data rate (such as MCS0). Further, aspects of the present disclosure recognize that one or more values of the MCS subfield are reserved in the user information field 1010 of the legacy trigger frame format. Thus, in some aspects, the DCM information may replace one of the reserved MCS values associated with the legacy trigger frame format.

In some implementations, the spatial stream allocation subfield 1412 may carry 6 bits of information indicating a starting spatial stream 1414 and a number of spatial streams 1416 on which the solicited PPDU is to be transmitted. More specifically, 4 bits may be used to indicate the starting spatial stream 1414 and the remaining 2 bits may be used to indicate the number of spatial streams 1416. Aspects of the present disclosure recognize that a maximum of 4 spatial streams may be allocated per STA in MU-MIMO communications. Because the RU allocation indicated in the RU allocation subfield 1404 is intended for multiple users, the number of spatial streams 1416 allocated to per user may be adequately represented by 2 bits. The remaining 4 bits may thus be used to indicate a starting spatial stream that can be indexed over 16 possible spatial streams.

In some implementations, the enhanced format subfield 1420 (which may also be referred to as an "HE/EHT" subfield) may carry a single bit of information indicating whether the solicited PPDU is to be a legacy TB PPDU or a non-legacy TB PPDU. In other words, a non-legacy STA may be required to transmit a legacy TB PPDU responsive to receiving an enhanced trigger frame even though the trigger frame is configured in accordance with the non-legacy trigger frame format. This may provide an even finer granularity of control over the type of PPDU that can be solicited and the type of STA that a PPDU can be solicited from.

Figure 15:
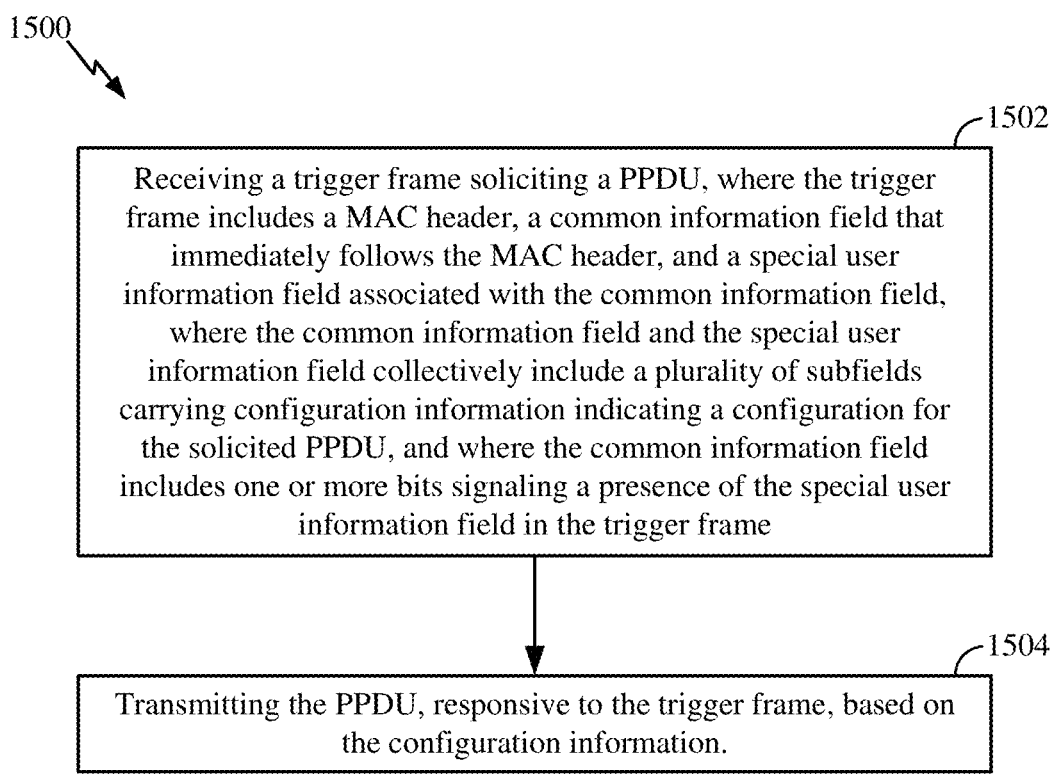
FIG. 15 shows a flowchart illustrating an example process for wireless communication that supports enhanced trigger frames according to some implementations.

FIG. 15 shows a flowchart illustrating an example process 1500 for wireless communication that supports enhanced trigger frames according to some implementations. In some implementations, the process 1500 may be performed by a wireless communication device operating as or within a STA such as one of the STAs 104 or 504 of FIGS. 1 and 5B, respectively.

In some implementations, the process 1500 begins in block 1502 by receiving a trigger frame soliciting a PPDU, where the trigger frame includes a MAC header, a common information field that immediately follows the MAC header, and a special user information field associated with the common information field, where the common information field and the special user information field collectively include a plurality of subfields carrying configuration information indicating a configuration for the solicited PPDU, and where the common information field includes one or more bits signaling a presence of the special user information field in the trigger frame. In block 1504, the process 1500 proceeds with transmitting the PPDU, responsive to the trigger frame, based on the configuration information.

In some aspects, the plurality of subfields may include an uplink bandwidth subfield carrying first bandwidth information associated with the PPDU and may further include an uplink bandwidth extension subfield carrying second bandwidth information associated with the PPDU, where the first and second bandwidth information jointly indicate a bandwidth associated with the PPDU. In some implementations, the bandwidth associated with the PPDU may be greater than 160 MHz. In some other aspects, the plurality of subfields may include a plurality of spatial reuse subfields in the special user information field, where the plurality of spatial reuse subfields indicates a plurality of spatial reuse thresholds associated with the PPDU. Still further, in some aspects, the plurality of subfields may include a bandwidth puncturing subfield in the special user information field, where the bandwidth puncturing subfield indicates whether one or more subbands spanning a bandwidth associated with the PPDU are punctured.

In some aspects, the special user information field may be the first user information field in a user information list immediately following the common information field. In some implementations, the special user information field may include an AID value not assigned to any STAs associated with the same BSS as the wireless communication device. In some implementations, the user information list may further include one or more user information fields carrying additional configuration for configuring the PPDU, where a format of each of the one or more user information fields is indicated by the one or more bits in the common information field and one or more bits in the respective user information field, where the format of each user information field is one of a legacy user information field format or a non-legacy user information field format.

In some implementations, a format of the PPDU may be indicated by the one or more bits in the common information field and the one or more bits in each of the one or more user information fields, where the format of the PPDU is one of a legacy PPDU format or a non-legacy PPDU format. In some implementations, each user information field formatted in accordance with the non-legacy user information field format may include a spatial stream allocation subfield indicating a number of spatial streams allocated for a user associated with the user information field and may further include a starting spatial stream index associated with the number of spatial streams, where the starting spatial stream index is one of sixteen spatial stream indices. In some implementations, the starting spatial stream index may be indicated by a 4-bit subfield of the spatial stream allocation subfield and the number of spatial streams may be indicated by a 2-bit subfield of the spatial stream allocation subfield.

Figure 16:
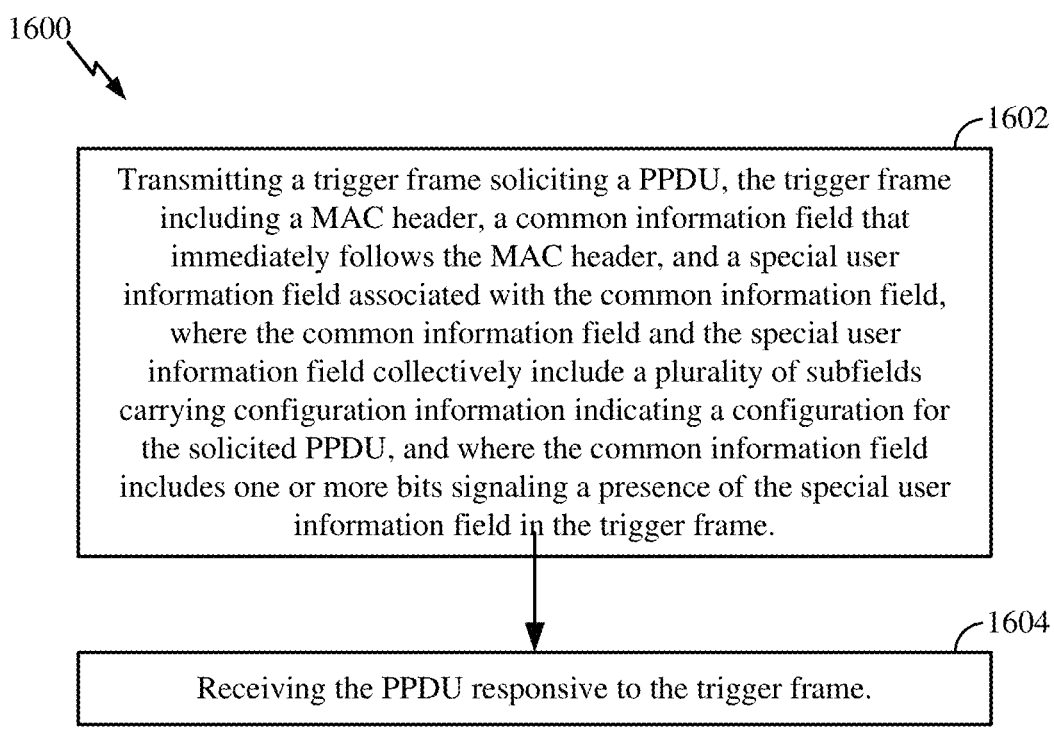
FIG. 16 shows a flowchart illustrating an example process for wireless communication that supports enhanced trigger frames according to some implementations.

FIG. 16 shows a flowchart illustrating an example process 1600 for wireless communication that supports enhanced trigger frames according to some implementations. In some implementations, the process 1600 may be performed by a wireless communication device operating as or within an AP such as one of the APs 102 or 502 of FIGS. 1 and 5A, respectively.

In some implementations, the process 1600 begins in block 1602 by transmitting a trigger frame soliciting a PPDU, the trigger frame including a MAC header, a common information field that immediately follows the MAC header, and a special user information field associated with the common information field, where the common information field and the special user information field collectively include a plurality of subfields carrying configuration information indicating a configuration for the solicited PPDU, and where the common information field includes one or more bits signaling a presence of the special user information field in the trigger frame. In block 1604, the process 1600 proceeds with receiving the PPDU responsive to the trigger frame.

In some aspects, the plurality of subfields may include an uplink bandwidth subfield carrying first bandwidth information associated with the PPDU and may further include an uplink bandwidth extension subfield carrying second bandwidth information associated with the PPDU, where the first and second bandwidth information jointly indicate a bandwidth associated with the PPDU. In some implementations, the bandwidth associated with the PPDU may be greater than 160 MHz. In some other aspects, the plurality of subfields may include a plurality of spatial reuse subfields in the special user information field, where the plurality of spatial reuse subfields indicates a plurality of spatial reuse thresholds associated with the PPDU. Still further, in some aspects, the plurality of subfields may include a bandwidth puncturing subfield in the special user information field, where the bandwidth puncturing subfield indicates whether one or more subbands spanning a bandwidth associated with the PPDU are punctured.

In some aspects, the special user information field may be the first user information field in a user information list immediately following the common information field. In some implementations, the special user information field may include an AID value not assigned to any STAs associated with the same BSS as the wireless communication device. In some implementations, the user information list may further include one or more user information fields carrying additional configuration for configuring the PPDU, where a format of each of the one or more user information fields is indicated by the one or more bits in the common information field and one or more bits in the respective user information field, where the format of each user information field is one of a legacy user information field format or a non-legacy user information field format.

In some implementations, a format of the PPDU may be indicated by the one or more bits in the common information field and the one or more bits in each of the one or more user information fields, where the format of the PPDU is one of a legacy PPDU format or a non-legacy PPDU format. In some implementations, each user information field formatted in accordance with the non-legacy user information field format may include a spatial stream allocation subfield indicating a number of spatial streams allocated for a user associated with the user information field and may further include a starting spatial stream index associated with the number of spatial streams, where the starting spatial stream index is one of sixteen spatial stream indices. In some implementations, the starting spatial stream index may be indicated by a 4-bit subfield of the spatial stream allocation subfield and the number of spatial streams may be indicated by a 2-bit subfield of the spatial stream allocation subfield.

Figure 17:
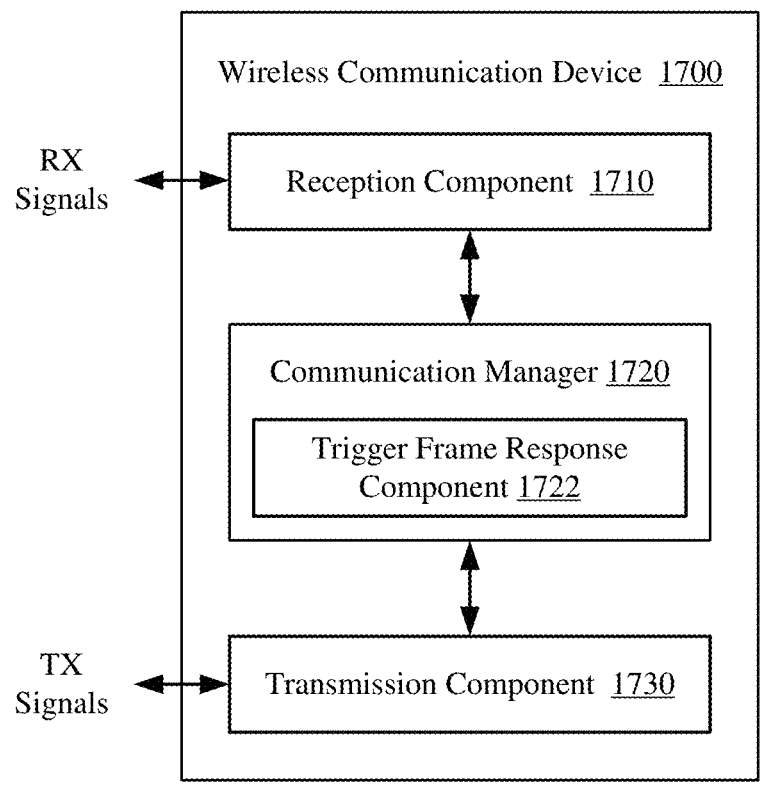
FIG. 17 shows a block diagram of an example wireless communication device according to some implementations.

FIG. 17 shows a block diagram of an example wireless communication device 1700 according to some implementations. In some implementations, the wireless communication device 1700 is configured to perform the process 1500 described above with reference to FIG. 15. In some implementations, the wireless communication device 1700 can be an example implementation of the wireless communication device 400 described above with reference to FIG. 4. For example, the wireless communication device 1700 can be a chip, SoC, chipset, package or device that includes at least one processor and at least one modem (for example, a Wi-Fi (IEEE 802.11) modem or a cellular modem).

The wireless communication device 1700 includes a reception component 1710, a communication manager 1720, and a transmission component 1730. The communication manager 1720 may further include a trigger frame response component 1722. Portions of the trigger frame response component 1722 may be implemented at least in part in hardware or firmware. In some implementations, the trigger frame response component 1722 is implemented at least in part as software stored in a memory (such as the memory 408). For example, portions of the trigger frame response component 1722 can be implemented as non-transitory instructions or code executable by a processor (such as the processor 406) to perform the functions or operations of the respective component.

The reception component 1710 is configured to receive RX signals from one or more other wireless communication devices and the transmission component 1730 is configured to transmit TX signals to one or more other wireless communication devices. In some implementations, the reception component 1710 may receive a trigger frame soliciting a PPDU, where the trigger frame includes a MAC header, a common information field that immediately follows the MAC header, and a special user information field associated with the common information field, where the common information field and the special user information field collectively include a plurality of subfields carrying configuration information indicating a configuration for the solicited PPDU, and where the common information field includes one or more bits signaling a presence of the special user information field in the trigger frame. The communication manager 1720 is configured to manage communications between the wireless communication device 1700 and one or more other wireless communication devices. In some implementations, the trigger frame response component 1722 may transmit the PPDU, responsive to the trigger frame, based on the configuration information.

Figure 18:
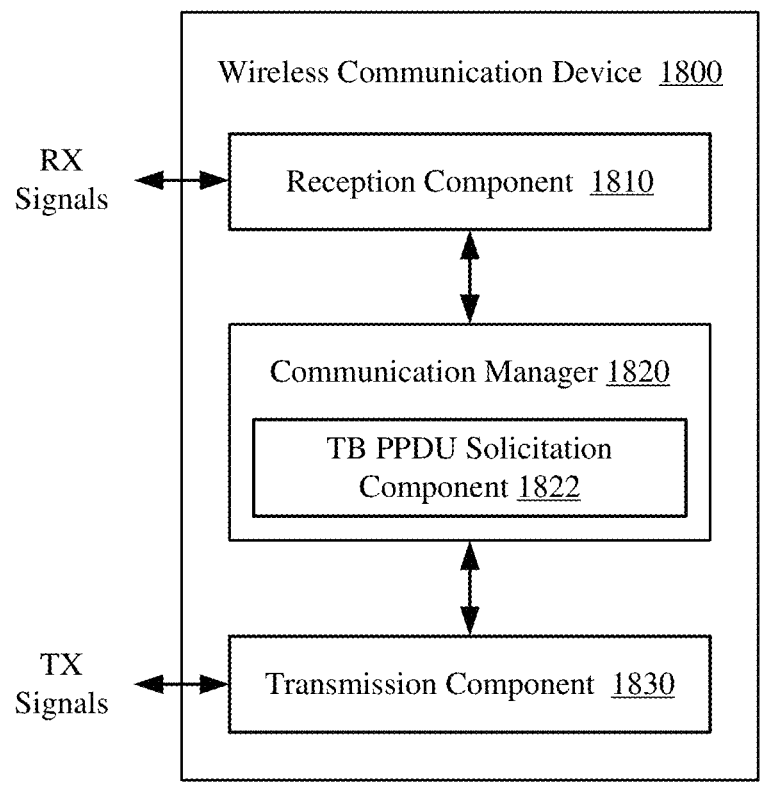
FIG. 18 shows a block diagram of an example wireless communication device according to some implementations.

FIG. 18 shows a block diagram of an example wireless communication device 1800 according to some implementations. In some implementations, the wireless communication device 1800 is configured to perform the process 1600 described above with reference to FIG. 16. In some implementations, the wireless communication device 1800 can be an example implementation of the wireless communication device 400 described above with reference to FIG. 4. For example, the wireless communication device 1800 can be a chip, SoC, chipset, package or device that includes at least one processor and at least one modem (for example, a Wi-Fi (IEEE 802.11) modem or a cellular modem).

The wireless communication device 1800 includes a reception component 1810, a communication manager 1820, and a transmission component 1830. The communication manager 1820 may further include a TB PPDU solicitation component 1822. Portions of the TB PPDU solicitation component 1822 may be implemented at least in part in hardware or firmware. In some implementations, the TB PPDU solicitation component 1822 is implemented at least in part as software stored in a memory (such as the memory 408). For example, portions of the TB PPDU solicitation component 1822 can be implemented as non-transitory instructions or code executable by a processor (such as the processor 406) to perform the functions or operations of the respective component.

The reception component 1810 is configured to receive RX signals from one or more other wireless communication devices and the transmission component 1830 is configured to transmit TX signals to one or more other wireless communication devices. The communication manager 1820 is configured to manage communications between the wireless communication device 1800 and one or more other wireless communication devices. In some implementations, the TB PPDU solicitation component 1822 may transmit a trigger frame soliciting a PPDU, where the trigger frame includes a MAC header, a common information field that immediately follows the MAC header, and a special user information field associated with the common information field, where the common information field and the special user information field collectively include a plurality of subfields carrying configuration information indicating a configuration for the solicited PPDU, and where the common information field includes one or more bits signaling a presence of the special user information field in the trigger frame. In some implementations, the reception component 1810 may receive the PPDU responsive to the trigger frame.

Implementation examples are described in the following numbered clauses:

1. A method for wireless communication by a wireless communication device, including:
   receiving a trigger frame soliciting a physical layer convergence protocol (PLCP) protocol data unit (PPDU), the trigger frame including a medium access control (MAC) header, a common information field that immediately follows the MAC header, and a special user information field associated with the common information field, the common information field and the special user information field collectively including a plurality of subfields carrying configuration information indicating a configuration for the solicited PPDU, the common information field including one or more bits signaling a presence of the special user information field in the trigger frame; and transmitting the PPDU, responsive to the trigger frame, based on the configuration information.

2. The method of clause 1, wherein the plurality of subfields includes an uplink bandwidth subfield carrying first bandwidth information associated with the PPDU and further includes an uplink bandwidth extension subfield carrying second bandwidth information associated with the PPDU, the first and second bandwidth information jointly indicating a bandwidth associated with the PPDU.

3. The method of any of clauses 1 or 2, wherein the bandwidth associated with the PPDU is greater than 160 MHz.

4. The method of any of clauses 1-3, wherein the plurality of subfields includes a plurality of spatial reuse subfields in the special user information field, the plurality of spatial reuse subfields indicating a plurality of spatial reuse thresholds associated with the PPDU.

5. The method of any of clauses 1-4, wherein the plurality of subfields includes a bandwidth puncturing subfield in the special user information field, the bandwidth puncturing subfield indicating whether one or more subbands spanning a bandwidth associated with the PPDU are punctured.

6. The method of any of clauses 1-5, wherein the special user information field is the first user information field in a user information list immediately following the common information field.

7. The method of any of clauses 1-6, wherein the special user information field includes an association identifier (AID) value not assigned to any wireless stations (STAs) associated with the same basic service set (BSS) as the wireless communication device.

8. The method of any of clauses 1-7, wherein the user information list further includes one or more user information fields carrying additional configuration for configuring the PPDU, a format of each of the one or more user information fields being indicated by the one or more bits in the common information field and one or more bits in the respective user information field, the format of each user information field being one of a legacy user information field format or a non-legacy user information field format.

9. The method of any of clauses 1-8, wherein a format of the PPDU is indicated by the one or more bits in the common information field and the one or more bits in each of the one or more user information fields, the format of the PPDU being one of a legacy PPDU format or a non-legacy PPDU format.

10. The method of any of clauses 1-9, wherein each user information field formatted in accordance with the non-legacy user information field format includes a spatial stream allocation subfield indicating a number of spatial streams allocated for a user associated with the user information field and may further include a starting spatial stream index associated with the number of spatial streams, the starting spatial stream index being one of sixteen spatial stream indices.

11. The method of any of clauses 1-10, wherein the starting spatial stream index is indicated by a 4-bit subfield of the spatial stream allocation subfield and the number of spatial streams is indicated by a 2-bit subfield of the spatial stream allocation subfield.

12. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 1-11.

13. A method for wireless communication by a wireless communication device, including:
transmitting a trigger frame soliciting a physical layer convergence protocol (PLCP) protocol data unit (PPDU), the trigger frame including a medium access control (MAC) header, a common information field that immediately follows the MAC header, and a special user information field associated with the common information field, the common information field and the special user information field collectively including a plurality of subfields carrying configuration information indicating a configuration for the solicited PPDU, the common information field including one or more bits signaling a presence of the special user information field in the trigger frame; and
receiving the PPDU responsive to the trigger frame.

14. The method of clause 13, wherein the plurality of subfields includes an uplink bandwidth subfield carrying first bandwidth information associated with the PPDU and further includes an uplink bandwidth extension subfield carrying second bandwidth information associated with the PPDU, the first and second bandwidth information jointly indicating a bandwidth associated with the PPDU.

15. The method of any of clauses 13 or 14, wherein the bandwidth associated with the PPDU is greater than 160 MHz.

16. The method of any of clauses 13-15, wherein the plurality of subfields includes a plurality of spatial reuse subfields in the special user information field, the plurality of spatial reuse subfields indicating a plurality of spatial reuse thresholds associated with the PPDU.

17. The method of any of clauses 13-16, wherein the plurality of subfields includes a bandwidth puncturing subfield in the special user information field, the bandwidth puncturing subfield indicating whether one or more subbands spanning a bandwidth associated with the PPDU are punctured.

18. The method of any of clauses 13-17, wherein the special user information field is the first user information field in a user information list immediately following the common information field.

19. The method of any of clauses 13-18, wherein the special user information field includes an association identifier (AID) value not assigned to any wireless stations (STAs) associated with the same basic service set (BSS) as the wireless communication device.

20. The method of any of clauses 13-19, wherein the user information list further includes one or more user information fields carrying additional configuration for configuring the PPDU, a format of each of the one or more user information fields being indicated by the one or more bits in the common information field and one or more bits in the respective user information field, the format of each user information field being one of a legacy user information field format or a non-legacy user information field format.

21. The method of any of clauses 13-20, wherein a format of the PPDU is indicated by the one or more bits in the common information field and the one or more bits in each of the one or more user information fields, the format of the PPDU being one of a legacy PPDU format or a non-legacy PPDU format.

22. The method of any of clauses 13-21, wherein each user information field formatted in accordance with the non-legacy user information field format includes a spatial stream allocation subfield indicating a number of spatial streams allocated for a user associated with the user information field and further includes a starting spatial stream index associated with the number of spatial streams, the starting spatial stream index being one of sixteen spatial stream indices.

23. The method of any of clauses 13-22, wherein the starting spatial stream index is indicated by a 4-bit subfield of the spatial stream allocation subfield and the number of spatial streams is indicated by a 2-bit subfield of the spatial stream allocation subfield.

24. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 13-23.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device comprising:
receiving a trigger frame soliciting a physical layer protocol data unit (PPDU), the trigger frame including a medium access control (MAC) header, a common information field that immediately follows the MAC header, and a special user information field associated with the common information field, the common information field and the special user information field collectively including a plurality of subfields carrying configuration information indicating a configuration for the solicited PPDU, the common information field including a first plurality of spatial reuse subfields indicating a first set of spatial reuse values and one or more bits signaling that the trigger frame includes the special user information field, the special user information field including a second plurality of spatial reuse subfields indicating a second set of spatial reuse values and an association identifier (AID) value not assigned to any wireless stations (STAs) associated with a basic service set (BSS) in common with the wireless communication device; and
transmitting the PPDU, responsive to the trigger frame, wherein the PPDU comprises one or more spatial reuse values of the second set of spatial reuse values in accordance with a bandwidth associated with the PPDU.

2. The method of claim 1, wherein the plurality of subfields includes an uplink bandwidth subfield carrying first bandwidth information associated with the PPDU and further includes an uplink bandwidth extension subfield carrying second bandwidth information associated with the PPDU, the first and second bandwidth information jointly indicating a bandwidth associated with the PPDU.

3. The method of claim 2, wherein the bandwidth associated with the PPDU is greater than 160 MHz.

4. The method of claim 1, wherein the plurality of subfields includes a bandwidth puncturing subfield in the special user information field, the bandwidth puncturing subfield indicating whether one or more subbands spanning a bandwidth associated with the PPDU are punctured.

5. The method of claim 1, wherein the special user information field is a first user information field in a user information list immediately following the common information field.

6. The method of claim 5, wherein the user information list further includes one or more user information fields carrying additional configuration for configuring the PPDU, a format of each of the one or more user information fields being indicated by the one or more bits in the common information field and one or more bits in the respective user information field, the format of each user information field being one of a legacy user information field format or a non-legacy user information field format.

7. The method of claim 6, wherein a format of the PPDU is indicated by the one or more bits in the common information field and the one or more bits in each of the one or more user information fields, the format of the PPDU being one of a legacy PPDU format or a non-legacy PPDU format.

8. The method of claim 6, wherein each user information field formatted in accordance with the non-legacy user information field format includes a spatial stream allocation subfield indicating a number of spatial streams allocated for a user associated with the user information field and may further include a starting spatial stream index associated with the number of spatial streams, the starting spatial stream index being one of sixteen spatial stream indices.

9. The method of claim 8, wherein the starting spatial stream index is indicated by a 4-bit subfield of the spatial stream allocation subfield and the number of spatial streams is indicated by a 2-bit subfield of the spatial stream allocation subfield.

10. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
receive a trigger frame soliciting a physical layer protocol data unit (PPDU), the trigger frame including a medium access control (MAC) header, a common information field that immediately follows the MAC header, and a special user information field associated with the common information field, the common information field and the special user information field collectively including a plurality of subfields carrying configuration information indicating a configuration for the solicited PPDU, the common information field including a first plurality of spatial reuse subfields indicating a first set of spatial reuse values and one or more bits signaling that the trigger frame includes the special user information field, the special user information field including a second plurality of spatial reuse subfields indicating a second set of spatial reuse values and an association identifier (AID) value not assigned to any wireless stations (STAs) associated with a basic service set (BSS) in common with the wireless communication device; and
transmit the PPDU, responsive to the trigger frame, wherein the PPDU comprises one or more spatial reuse values of the second set of spatial reuse values in accordance with a bandwidth associated with the PPDU.

11. The wireless communication device of claim 10, wherein the special user information field is a first user information field in a user information list immediately following the common information field.

12. The wireless communication device of claim 11, wherein the user information list further includes one or more user information fields carrying additional configuration for configuring the PPDU, a format of each of the one or more user information fields being indicated by the one or more bits in the common information field and one or more bits in the respective user information field, the format of each user information field being one of a legacy user information field format or a non-legacy user information field format.

13. The wireless communication device of claim 12, wherein a format of the PPDU is indicated by the one or more bits in the common information field and the one or more bits in each of the one or more user information fields, the format of the PPDU being one of a legacy PPDU format or a non-legacy PPDU format.

14. A method for wireless communication by a wireless communication device, comprising:
transmitting a trigger frame soliciting a physical layer protocol data unit (PPDU), the trigger frame including a medium access control (MAC) header, a common information field that immediately follows the MAC header, and a special user information field associated with the common information field, the common information field and the special user information field collectively including a plurality of subfields carrying configuration information indicating a configuration for the solicited PPDU, the common information field including a first plurality of spatial reuse subfields indicating a first set of spatial reuse values and one or more bits signaling that the trigger frame includes the special user information field, the special user information field including a second plurality of spatial reuse subfields indicating a second set of spatial reuse values and an association identifier (AID) value not assigned to any wireless stations (STAs) associated with a basic service set (BSS) in common with the wireless communication device; and
receiving the PPDU responsive to the trigger frame, wherein the PPDU comprises one or more spatial reuse values of the second set of spatial reuse values in accordance with a bandwidth associated with the PPDU.

15. The method of claim 14, wherein the plurality of subfields includes an uplink bandwidth subfield carrying first bandwidth information associated with the PPDU and further includes an uplink bandwidth extension subfield carrying second bandwidth information associated with the PPDU, the first and second bandwidth information jointly indicating a bandwidth associated with the PPDU.

16. The method of claim 15, wherein the bandwidth associated with the PPDU is greater than 160 MHz.

17. The method of claim 14, wherein the plurality of subfields includes a bandwidth puncturing subfield in the special user information field, the bandwidth puncturing subfield indicating whether one or more subbands spanning a bandwidth associated with the PPDU are punctured.

18. The method of claim 14, wherein the special user information field is a first user information field in a user information list immediately following the common information field.

19. The method of claim 18, wherein the user information list further includes one or more user information fields carrying additional configuration for configuring the PPDU, a format of each of the one or more user information fields being indicated by the one or more bits in the common information field and one or more bits in the respective user information field, the format of each user information field being one of a legacy user information field format or a non-legacy user information field format.

20. The method of claim 19, wherein a format of the PPDU is indicated by the one or more bits in the common information field and the one or more bits in each of the one or more user information fields, the format of the PPDU being one of a legacy PPDU format or a non-legacy PPDU format.

21. The method of claim 19, wherein each user information field formatted in accordance with the non-legacy user information field format includes a spatial stream allocation subfield indicating a number of spatial streams allocated for a user associated with the user information field and further includes a starting spatial stream index associated with the number of spatial streams, the starting spatial stream index being one of sixteen spatial stream indices.

22. The method of claim 21, wherein the starting spatial stream index is indicated by a 4-bit subfield of the spatial stream allocation subfield and the number of spatial streams is indicated by a 2-bit subfield of the spatial stream allocation subfield.

23. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
transmit a trigger frame soliciting a physical layer protocol data unit (PPDU), the trigger frame including a medium access control (MAC) header, a common information field that immediately follows the MAC header, and a special user information field associated with the common information field, the common information field and the special user information field collectively including a plurality of subfields carrying configuration information indicating a configuration for the solicited PPDU, the common information field including a first plurality of spatial reuse subfields indicating a first set of spatial reuse values and one or more bits signaling that the trigger frame includes the special user information field, the special user information field including a second plurality of spatial reuse subfields indicating a second set of spatial reuse values and an association identifier (AID) value not assigned to any wireless stations (STAs) associated with a basic service set (BSS) in common with the wireless communication device; and
receive the PPDU responsive to the trigger frame, wherein the PPDU comprises one or more spatial reuse values of the second set of spatial reuse values in accordance with a bandwidth associated with the PPDU.

24. The wireless communication device of claim 23, wherein the special user information field is a first user information field in a user information list immediately following the common information field.

25. The wireless communication device of claim 24, wherein the user information list further includes one or more user information fields carrying additional configuration for configuring the PPDU, a format of each of the one or more user information fields being indicated by the one or more bits in the common information field and one or more bits in the respective user information field, the format of each user information field being one of a legacy user information field format or a non-legacy user information field format.

26. The wireless communication device of claim 25, wherein a format of the PPDU is indicated by the one or more bits in the common information field and the one or more bits in each of the one or more user information fields, the format of the PPDU being one of a legacy PPDU format or a non-legacy PPDU format.

* * * * *